(12) United States Patent
Rintz et al.

(10) Patent No.: US 6,355,885 B1
(45) Date of Patent: *Mar. 12, 2002

(54) SUB FRAME ASSEMBLY FOR LIGHT SWITCH ASSEMBLY

(76) Inventors: William J. Rintz, 1200A NW. 17th Ave., Boca Raton, FL (US) 33486; Angel L. Colon, 6074 Sherwood Glen Way, #4, West Palm Beach, FL (US) 33415

( * ) Notice: Subject to any disclaimer, the term of this patent is extended or adjusted under 35 U.S.C. 154(b) by 0 days.

This patent is subject to a terminal disclaimer.

(21) Appl. No.: 09/550,532

(22) Filed: Apr. 17, 2000

Related U.S. Application Data

(63) Continuation-in-part of application No. 09/009,710, filed on Jan. 20, 1998, now Pat. No. 6,051,787, which is a continuation-in-part of application No. 08/826,643, filed on Apr. 4, 1997, now Pat. No. 5,874,693, which is a continuation-in-part of application No. 08/769,623, filed on Dec. 18, 1996, now Pat. No. 5,811,730, which is a continuation-in-part of application No. 08/640,538, filed on May 2, 1996, now Pat. No. 5,811,729.

(51) Int. Cl.[7] .................................................. H02G 3/14
(52) U.S. Cl. ........................... 174/66; 174/67; 220/241; 220/242
(58) Field of Search ...................... 174/66, 67; 220/241, 220/242; D8/353; D13/177; 200/302.3, 333, 302.1, 317, 310

(56) References Cited

U.S. PATENT DOCUMENTS

| | | | | |
|---|---|---|---|---|
| 2,515,820 A | * | 7/1950 | Clark | 40/542 |
| 4,135,337 A | * | 1/1979 | Medlin | 220/3.3 |
| 4,591,656 A | * | 5/1986 | Mohr | 174/48 |
| 4,707,564 A | * | 11/1987 | Gonzales | 174/66 |
| 5,811,730 A | * | 9/1998 | Rintz | 174/66 |

* cited by examiner

Primary Examiner—Dean A. Reichard
Assistant Examiner—Dhiru R Patel
(74) Attorney, Agent, or Firm—Malin, Haley & DiMaggio, P.A.

(57) ABSTRACT

A light switch cover is disclosed for use with conventional "rocker or tactile" and "toggle" type switches. The cover generally includes a mounting bracket which is attached to the electrical box, along with the switch and a face plate which is attached to the mounting bracket. For "rocker or tactile" type switches, the face plate is preferably constructed from a soft material to allow the user to operate the covered "rocker" switch, but can be made of a combination of hard and soft materials. For "toggle" type switches an aperture is provided in the face plate to operate the toggle. Preferably, the outer surface of the face plate is provided with a decorated design or other indicia. The light switch can also be utilized where more than one switch is provided. For multiple "rocker or tactile" switches, a diverter bar is provided on the mounting bracket, to absorb pressure being asserted on one "rocker" switch from also transferring to an adjacent "rocker or tactile" switch and inadvertently turning "off" or "on" the adjacent "rocker or tactile" switch. An inner or sub-frame can be provided to allow for an outer frame of any shape with a standard shaped mounting bracket. This assembly includes an outer frame, a flexible decorative sheet, an inner/sub frame and a mounting bracket 1050. The cover assembly completely covers a switch assembly, while allowing the switch assembly to be operated while covered.

12 Claims, 26 Drawing Sheets

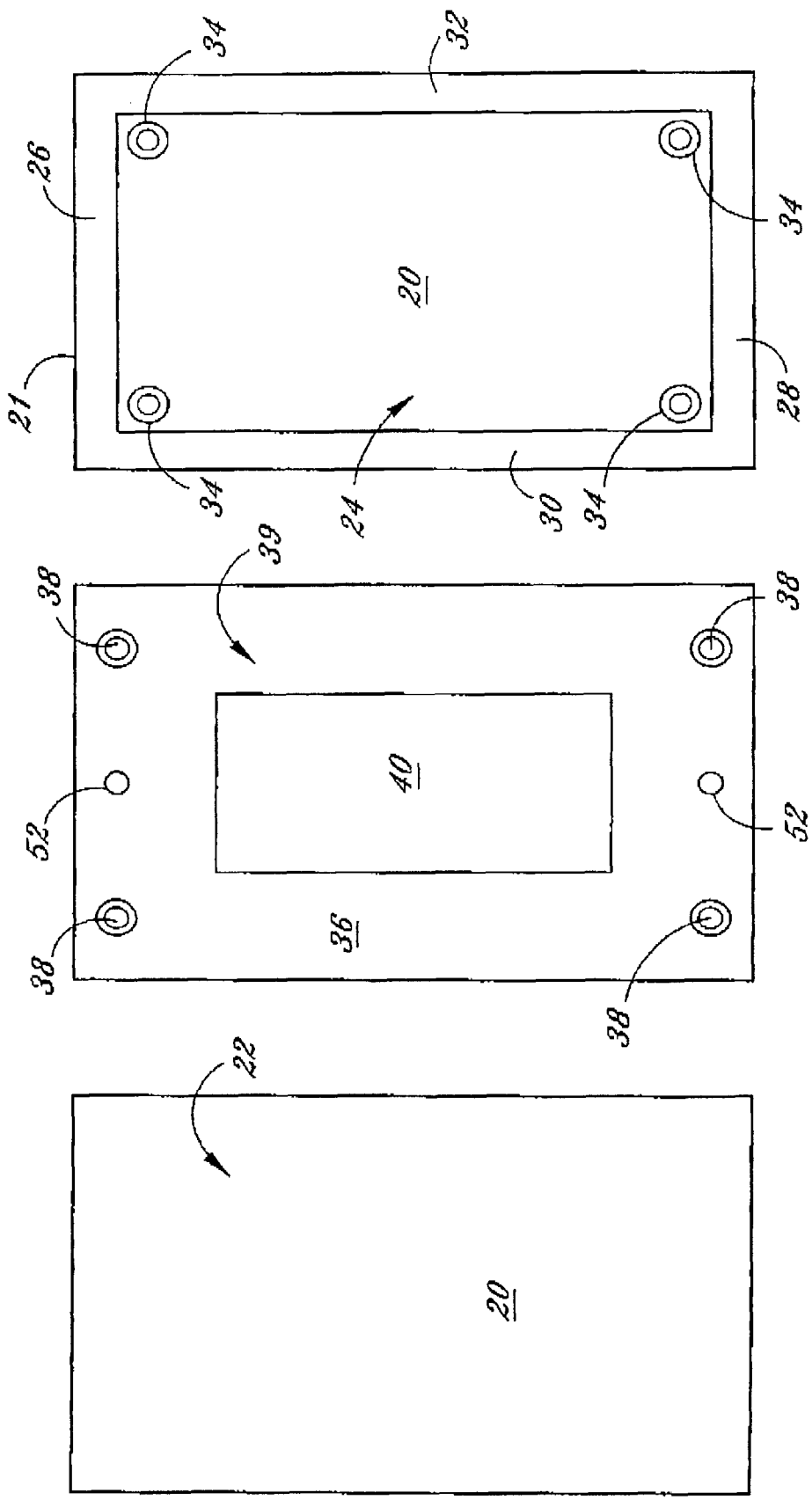

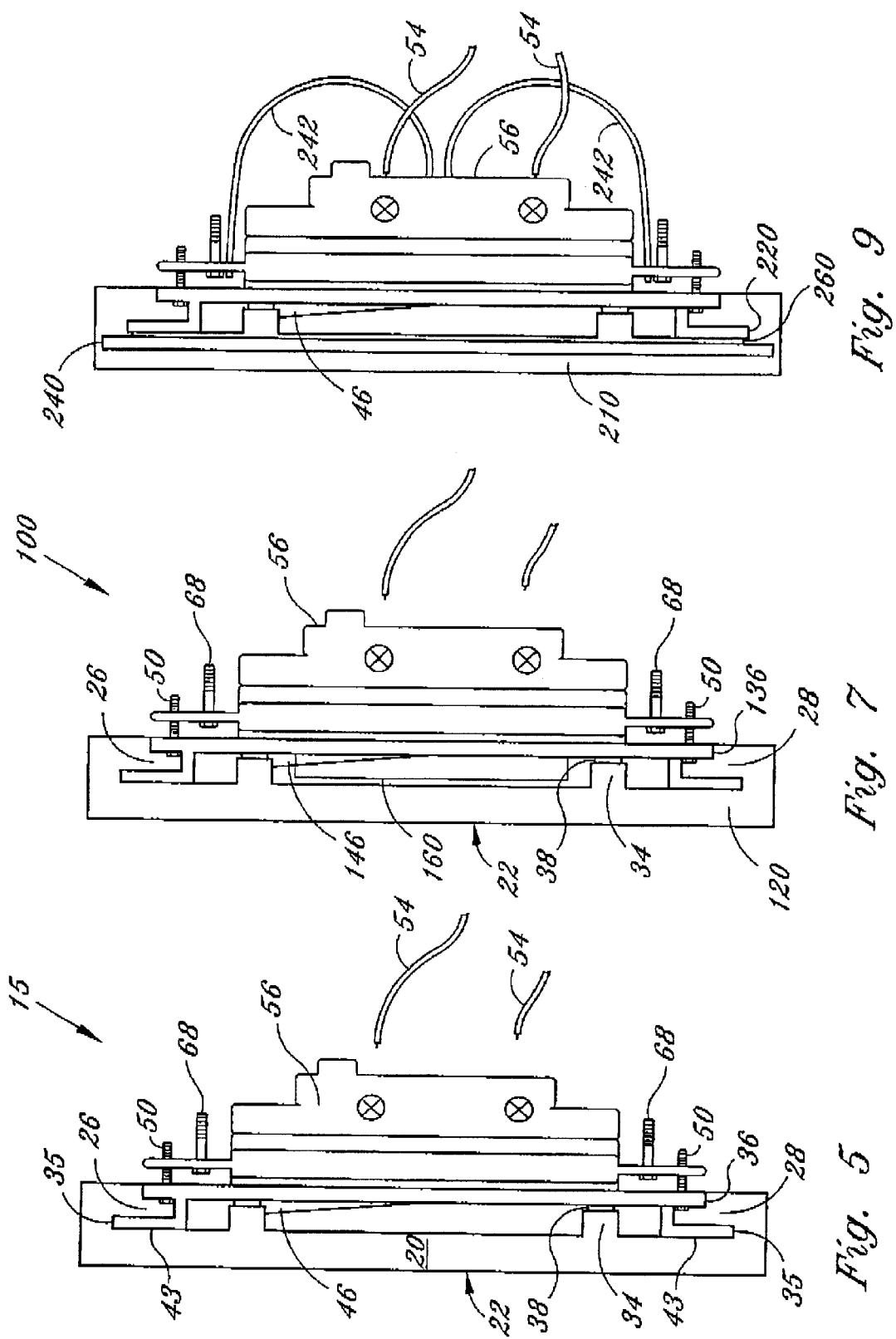

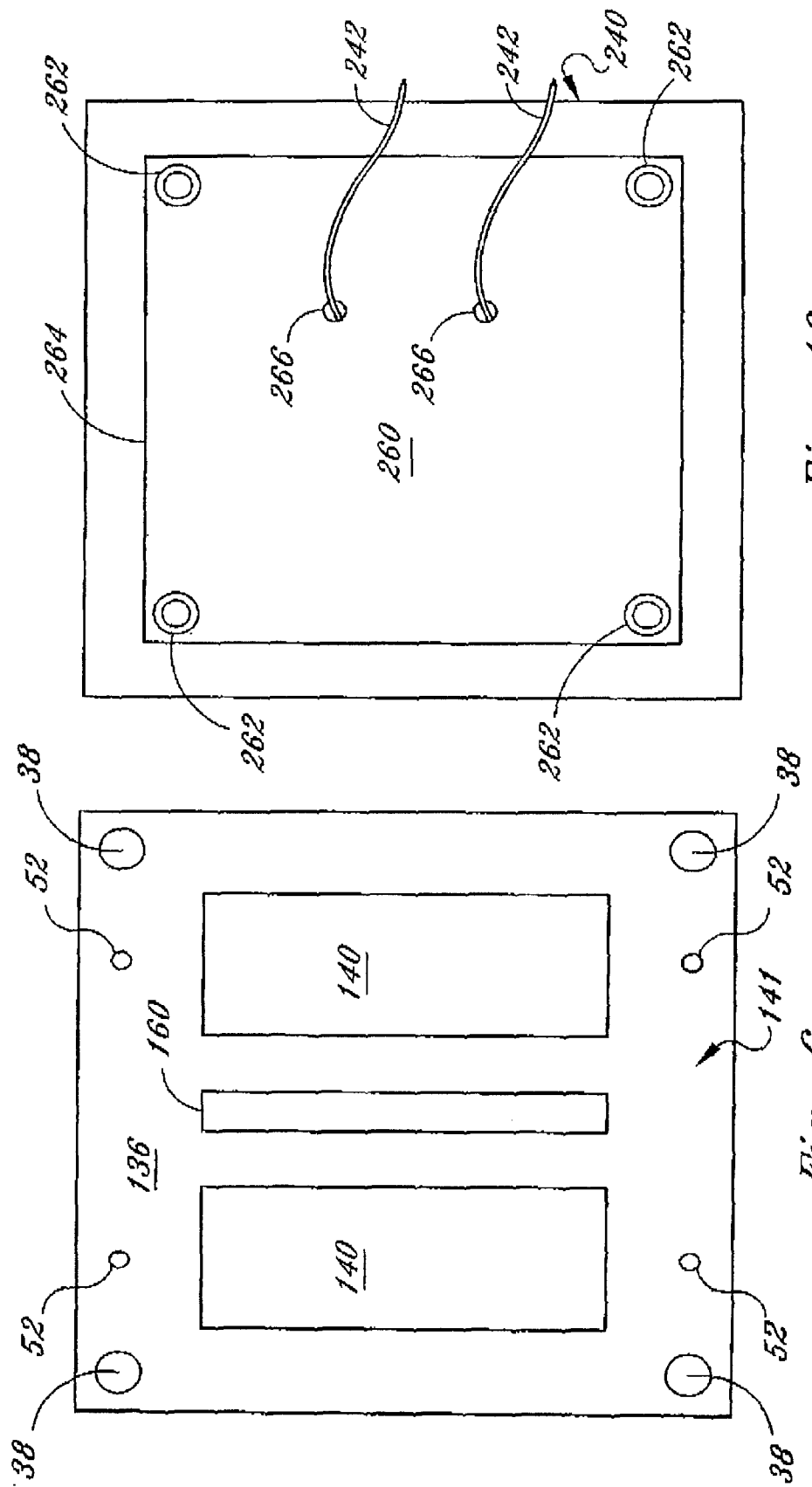

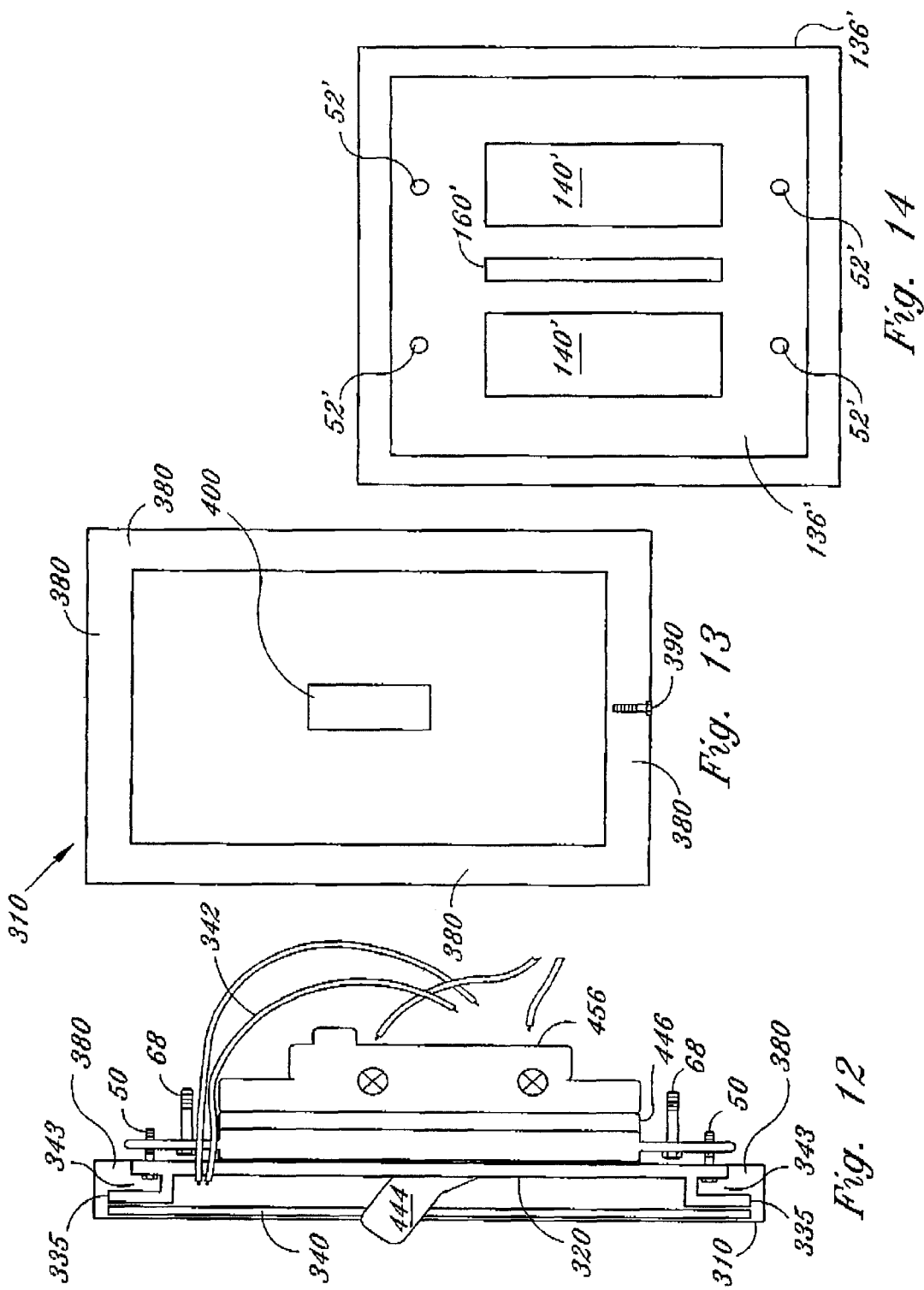

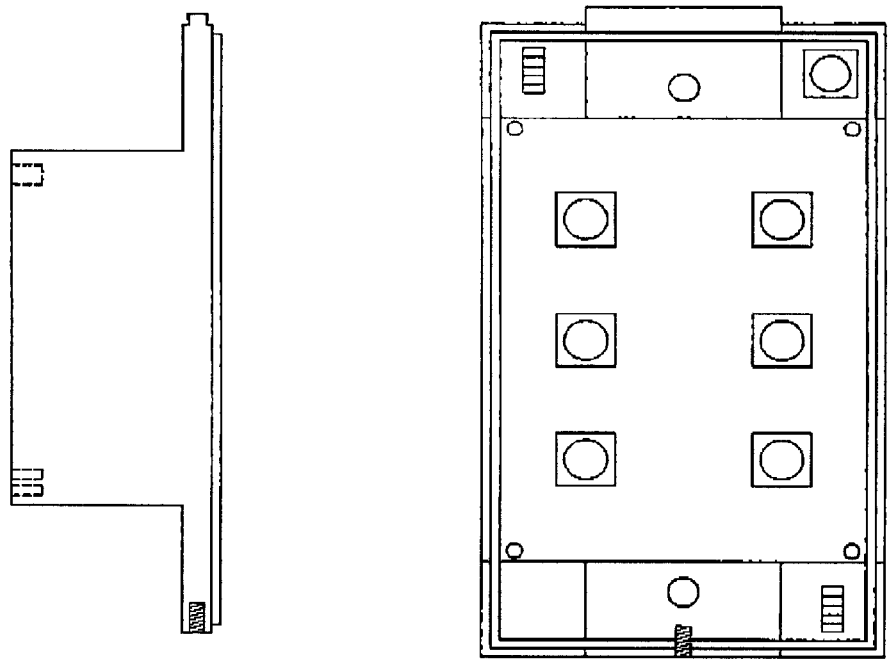
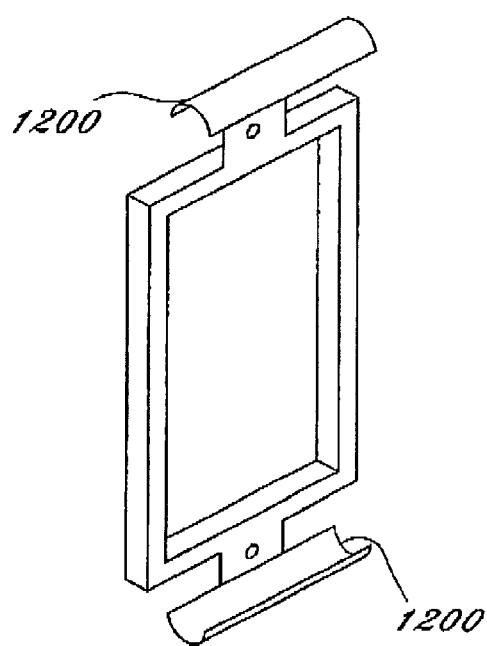
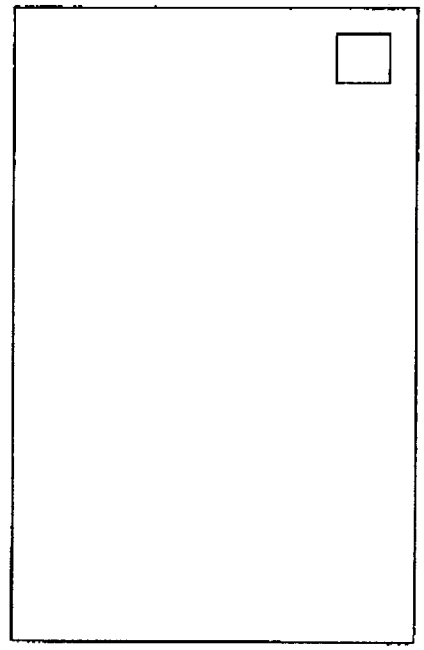
Fig. 41

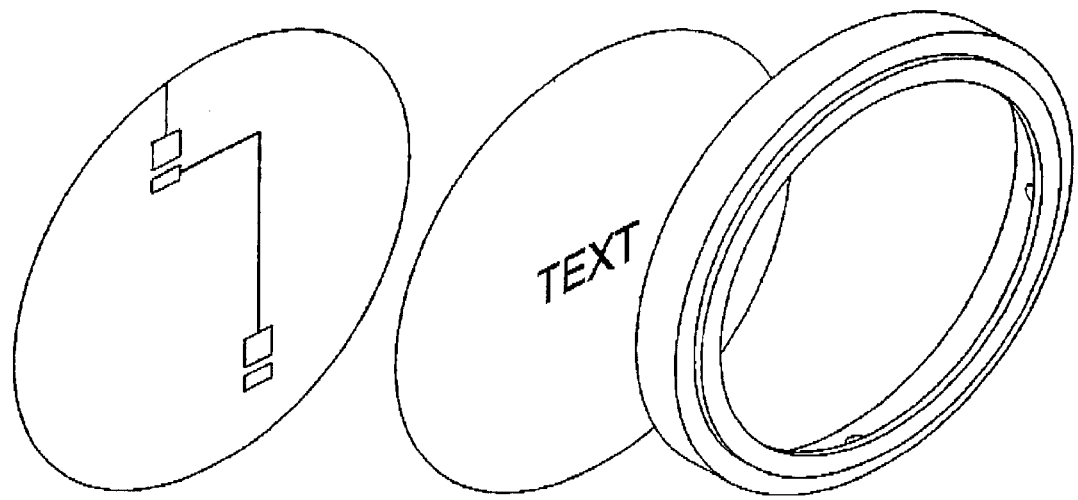
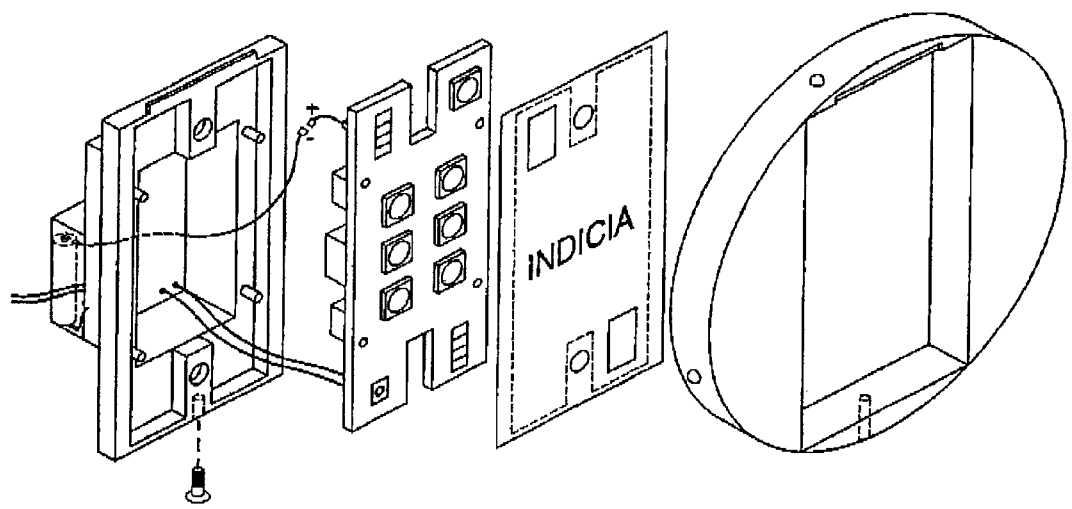
Fig. 43

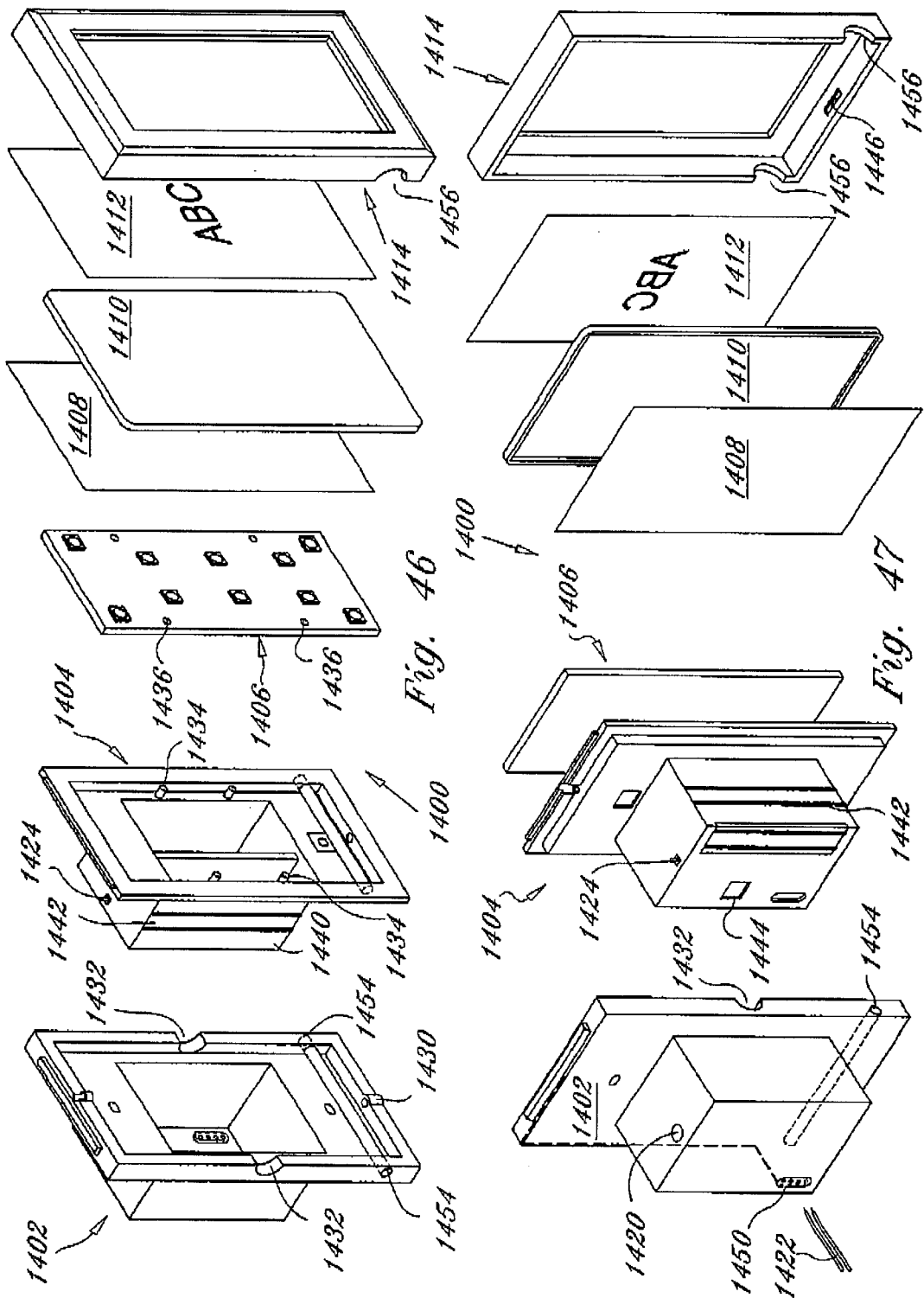

SUB FRAME ASSEMBLY FOR LIGHT SWITCH ASSEMBLY

CROSS-REFERENCE TO RELATED APPLICATIONS

This is a continuation-in-part of application Ser. No. 09/009,710, filed on Jan. 20, 1998 now U.S. Pat. No. 6,051,787, which is a continuation-in-part of application Ser. No. 08/826,643, filed on Apr. 4, 1997, now U.S. Pat. No. 5,874,693, which is a continuation-in-part of application Ser. No. 08/769,623, filed on Dec. 18, 1996, now U.S. Pat. No. 5,811,730, which is a continuation-in-part of application Ser. No. 08/640,538, filed on May 2, 1996, now U.S. Pat. No. 5,811,729.

STATEMENT REGARDING FEDERALLY SPONSORED RESEARCH OR DEVELOPMENT

Not applicable.

BACKGROUND OF THE INVENTION

1. Field of the Invention

This invention relates generally to light switch covers and receptacle covers particularly to a combination decorative light switch cover and mounting bracket for use with "rocker", "toggle", and other type light switches.

2. Description of the Prior Art

Rigid light switch covers have been utilized in the past for safety means. Three disadvantages associated with the use of rigid light switch covers are (1) inoperability of covered light switch; (2) unattractiveness of the cover; and (3) difficulties in attaching the rigid light switch cover. To utilize the covered switch, the user must each time remove the cover. Conventional light switch covers have not been use in the past as a decorative element, but merely for safety purposes.

Some examples of previous cover devices include: U.S. Pat. No. 4,760,227 issued to Boxer (the "Boxer" device); U.S. Pat. No. 4,757,168 issued to Fujiyoshi et al (the "Fujiyoshi" device); U.S. Pat. No. 5,457,286 issued to Flasz (the "Flasz" device); and U.S. Pat. No. 4,488,024 issued to Colgate (the "Colgate" device).

The Boxer device provides a sliding switch cover assembly which comprises a switch plate on which a toggle actuator is mounted by two sets of vertically aligned pins extending from the switch plate. Vertical slots are provided in the actuator in alignment with the two sets of vertically aligned pins. The toggle switch is turned off and on by the actuator plate which slides up and down the vertically aligned pins.

The Fujiyoshi device provides a switch device comprising a mounting frame having a switch body. The switch is designed to be attachable or detachable from a switch working portion.

The Flasz device provides a face plate assembly which is secured over an electrical switch or output source. The assembly includes a frame structure having at least one opening in a flat central area which surrounds an electricity controlled casing. A plurality of key plates are provided, with one key plate being positioned so that it can pivot.

The Colgate device provides wall switch cover and actuator which is used with a standard wall toggle switch. The cover and actuator comprise a frame which is held in position on the switch and the switch cover plate. The switch actuator is held within the frame, and portions of the switch actuator abut opposite sides of the toggle switch. A cover is also mounted on the frame over the switch actuator.

In new construction, "rocker" type light switches have virtually replaced previously used "toggle" type light switches. Thus, what is needed in the art is a light switch cover, which (1) can be utilized with "rocker" type light switches; (2) completely cover the underneath light switch; (3) provide a decorative element which adds artistic value to the room; (4) provides an easy attachment method for attaching the cover; and (5) can be utilized with "toggle" type light switches. It is therefore, to the effective resolution of the aforementioned problems and shortcomings of the prior art that the present invention is directed.

BRIEF SUMMARY OF THE INVENTION

The present invention provides a light switch cover which is preferably, utilized with a conventional "rocker" type switch, and alternately can be utilized with a conventional "toggle" type switch, and/or a tactile or pressure sensitive, or dome type switch. The cover includes a mounting bracket which is attached to the electrical box, along with the light switch and a face plate which is attached to the mounting bracket. The face plate is preferably constructed from a soft material, to allow the user to operate with a covered "rocker" switch or a pressure sensitive switch. The face plate can alternately be provided with an opening to provide access for the toggle of a "toggle" type switch. Preferably, the outer surface of the face plate is provided with a decorated design, logo, picture, photograph, wording, indicia, or any other decorative, informational or promotional indicia.

The present invention can also be utilized where more than one switch is provided. For multiple "rocker" type switches, a diverter bar is provided on the mounting bracket, to absorb pressure being asserted on one "rocker" switch from also transferring to an adjacent "rocker" switch and inadvertently turning "off" or "on" the adjacent "rocker" switch.

Additionally, an electroluminescent lighting sheet can also be provided between the face plate and mounting bracket to highlight and enhance the decorative features of the present invention light switch cover. The lighting sheet receives power via associated wires that are connected to the conventional switch box.

A battery back-up and sensing circuit can be included that automatically illuminates the light switch cover, in any of the embodiments of the present invention, whenever a loss of power is sensed. Thus, if power is lost, light switch covers utilizing the present invention with the battery back-up and sensing circuit, would automatically turn on, providing "night-light" type illumination within the house, or wherever the light switch cover is used. The battery back-up and sensing circuit can include a manual switch that turns the illuminated light switch cover off.

Accordingly, it is an object of the present invention to provide a light switch cover and mounting bracket for use in conjunction with a rocker switch.

It is another object of the present invention to provide a light switch cover that fully shields the rocker switch and receptacle from external access for safety purposes.

It is a further object of the present invention to provide a light switch cover made of flexible materials to allow the covered rocker switch to be operable.

It is still another object of the present invention to provide a light switch cover which provides aesthetic features.

It is yet another object of the present invention to provide a light switch cover which will illuminate when the rocker switch is in an "off" position.

It is yet a further object of the present invention to provide a light switch cover and mounting bracket for use in conjunction with a toggle switch.

It is still a further object of the present invention to provide a light switch cover which includes a battery back-up and sensing circuit that illuminates the light switch cover whenever power is lost.

It is another object of the present invention to provide a light switch cover that illuminates whenever power is lost and that includes a manual switch to turn the light switch cover off.

In accordance with these and other objects which will become apparent hereinafter, the instant invention will now be described with particular reference to the accompanying drawings.

BRIEF DESCRIPTION OF THE SEVERAL VIEWS OF THE DRAWINGS

This invention may be better understood by reference to the drawings in which:

FIG. 2 illustrates a front view of the face plate member of the light switch cover shown in FIG. 1;

FIG. 3 illustrates a front view of the mounting bracket member of the light switch cover shown in FIG. 1;

FIG. 4 illustrates a back view of the face plate member shown in FIG. 1;

FIG. 5 illustrates a side sectional view of the first embodiment light switch cover;

FIG. 6 illustrates a front view of a mounting bracket in accordance with a second embodiment of the present invention;

FIG. 7 illustrates a side sectional view of the second embodiment light switch cover;

FIG. 9 illustrates a side sectional view of the third embodiment light switch cover;

FIG. 10 illustrates a perspective back view of an attachment sheet in accordance with the third embodiment light switch cover;

FIG. 12 illustrates a side sectional view of the alternate embodiment shown in FIG. 11;

FIG. 13 illustrates a front view of the face plate member of the light switch cover shown in FIG. 11;

FIG. 14 illustrates a front view of a mounting bracket in accordance with an alternate embodiment of the present invention;

FIGS. 41 and 42 illustrated an alternative cover assembly embodiment;

FIGS. 43 illustrate an exploded perspective view of the cover assembly embodiment of FIG. 37 incorporated into a light switch assembly embodiment of the present invention;

FIGS. 46 and 47 illustrates, front and back, respectively, exploded perspective view of another light switch embodiment in accordance with the present invention.

DETAILED DESCRIPTION OF THE INVENTION

Figure 1:
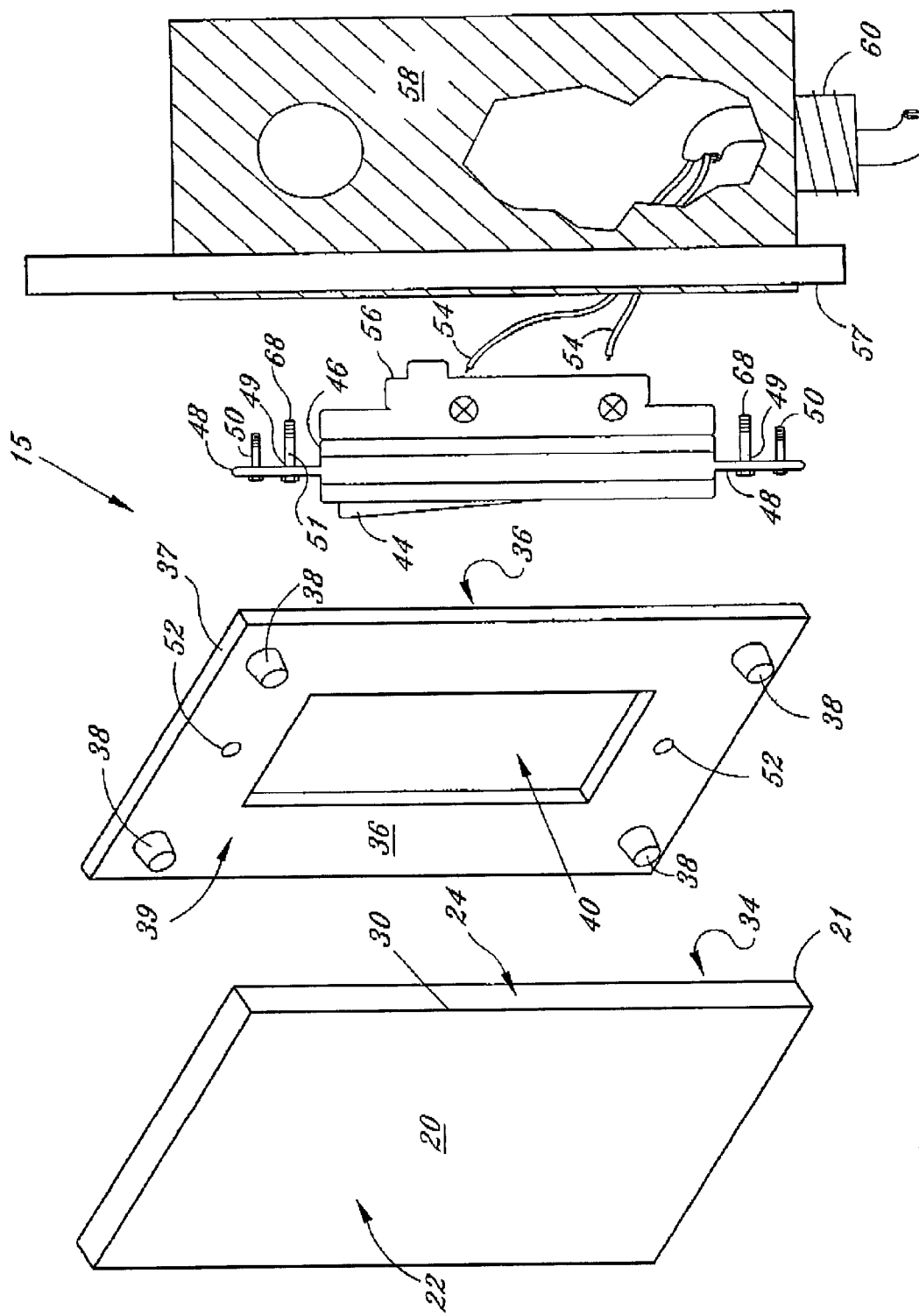
FIG. 1 illustrates an exploded view of a first embodiment for the light switch cover in accordance with the present invention.

As seen in FIGS. 1 through 4, a first embodiment of the present invention light switch cover is shown and generally designated as reference numeral 15. Cover 15 generally consists of a face plate 20 and a mounting bracket 36.

Face plate 20 consists of a body member 21 having an outer surface 22 and inner surface 24. A top lip 26, a bottom lip 28, a first side lip 30, and a second side lip 32 can be provided and are preferably, constructed integral to respective edge portions of body member 21. Face plate 20 is preferably constructed from a castable, soft, flexible material such as neoprene, silicone, vinyl, etc., to allow a conventional rocker switch 46 to be operated while face plate 20 is disposed over rocker switch 46 for safety purposes. Though not preferred, face plate 20 can also be constructed from a rigid plastic or the like. However, with the rigid material, the user cannot utilize covered rocker switch 46. Outer surface 22 can be provided with any type of decorative design or indicia. Outer surface 22 can also be provided with a hand carved design, such as replicas of famous art. Additionally, a screen print design can be directly applied to face plate 20. As such, a plurality of interchangeable face plates 20 each having a different decorative design can be provided depending on the mood of the user.

A plurality of female receiving ports 34 are provided on inner surface 24 of body member 21 for receipt of respective dowel or peg members 38 associated with mounting bracket 36, discussed in detail below. Preferably, four ports 34 and pegs 38 are provided. However, such is not limiting and a different number of ports 34 and pegs 38 can be utilized and is considered within the scope of the present invention.

Mounting bracket 36 includes a body member 37 having an inner surface 39 and an outer surface 41. Mounting bracket 36 can be constructed from a rigid epoxy, rigid plastic, castable plastic, etc. An opening 40 is provided through body member 37 to allow a protruding switch portion 44 of a rocker switch 46 to pass through when mounting bracket 36 is properly attached. As stated above, a plurality of protruding pegs 38 are provided and attached to inner surface 39 of body member 37. Mounting bracket 36 is also provided with preferably two apertures 52 for receipt of mounting screws 50. Preferably, apertures 52 are disposed above and below opening 40, however, other locations for apertures 52 are considered within the scope of the invention.

A wall 57 has embedded therein an electrical box 58 and conduit 60. Conduit 60 houses electrical conducting wires 54. The exposed ends of electrical wires 54 are attached to a switch box 56 by conventional means. Switch box 56 is housed within electrical box 58 by conventional means. Switch box 56 is attached to a back portion of rocker switch 46, as well as being operatively associated with rocker switch 46. Rocker switch 46 is provided with outer flanges 48 preferably at a top and bottom end of rocker switch 46. Flanges 48 are each provided with an aperture 49 for receipt of mounting screws 68 which attach rocker switch 46 to electrical box 58.

The location of apertures 52 in body member 37 are chosen to align with mounting bracket attachment apertures of rocker switch 46 which are preferably disposed above or below apertures 49, to allow a respective mounting screw 50 to be inserted through apertures 52 and mounting bracket attachment aperture for attaching mounting bracket 36 to rocker switch 46 when assembling light switch cover 15. The mounting bracket attachment apertures have been previously provided on rocker switch 46 for attachment of a conventional light face plate.

To assemble light switch cover 15, mounting screws 68 are each inserted in their respective apertures 49 and corresponding conventional screw passageways (not shown) associated with embedded electrical box 58, to attach rocker switch 46 to electrical box 58. Mounting screws 50 are then inserted through respective apertures 52 and mounting bracket attachment apertures for attaching mounting bracket 36 to rocker switch 46. Preferably, all passageways and apertures, described in this paragraph, have interior threads which mate with exterior threads of screws 50 and 68 through use of conventional means such as a regular or Phillips head screwdriver.

Once mounting screws 50 and 68 have been fully turned or inserted within their respective apertures and electrical box passageways, mounting bracket 36 is disposed flush or abutting wall 57 and a light activating portion 44 of rocker switch 46 protrudes out of wall 57 and through opening 40.

When attaching face plate 20 to mounting bracket 36, female ports 34 are aligned with their respective protruding pegs 38, and face plate 20 is moved to allow each port 34 to receive its respective peg 38. The inner diameter of port 34 is slightly larger than the outer diameter of its respective peg 38 to provide a snug and tight fit to provide a secure attachment of face plate 20 to mounting bracket 36. The depth of face plate 20, which is defined by its lip members 26, 28, 30 and 32 is preferably approximately equal to the protruding length of pegs 38 to allow the edges of lip members 26, 28, 30 and 32 to abut wall 57 when face plate 20 is properly attached to mounting bracket 36. As face plate 20 is preferably constructed from a flexible material, rocker switch 46 can still be operated, while face plate 20 provides a safety means, as well as a decorative feature, by fully covering rocker switch 46.

As an additional safety feature, a second attachment point for attaching face plate 20 to mounting bracket 36 can be provided. As best seen in FIG. 5, lip members 26, 28, 30 and 32 define an inner peripheral groove 35 which mates with a mounting bracket peripheral flange 43 to help prevent face plate 20 from inadvertently being detached from mounting bracket 36. When attaching face plate 20 having a groove 35 to mounting bracket 36 having flange 43, initially the top portion of flange 43 is position within the portion of groove 35 defined by top lip member 26. Next the side portions of flange 43 and positioned within the portions of groove 35 defined by side lip members 30 and 32, while also inserting pegs 38 within the respective receiving ports 34. Lastly the bottom portion of flexible face plate 20 is pulled down by the installer's hands or a small grabbing tool to allow the bottom portion of flange 43 to be inserted within the portion of groove 35 defined by lip member 28.

Once properly disposed, the installer releases the pull on the bottom portion of face plate 20, providing for a very secure and tight fit between face plate 20 and mounting bracket 36.

To remove face plate 20, the steps described above for attaching face plate 20 are performed in reverse with the installer initially pulling down on the bottom portion of face plate 20 with either his or her hands, or by the previously mentioned small grabbing tool, thus causing the bottom portion of flange 43 to no longer be disposed within groove 35.

Once light switch cover 15 is properly attached, a person wishing to position rocker switch 46 in an "off" or "on" position, merely presses on soft face plate 20, which allows the person to also directly press switch 46.

The teachings of the first embodiment of the present invention can also be utilized when more than one rocker switch 146 is provided. As seen in FIGS. 6 and 7, a second embodiment light switch cover 100 of the present invention is illustrated incorporating a mounting bracket 136 having multiple openings 140 for receiving multiple protruding rocker switches 146. Face plate 120 is attached to mounting bracket 136 similar to the two attachment methods (groove 35/flange 43 and/or ports 34/pegs 38) described above. Face plate 120 can be structured and constructed identical to face plate 20 of the first embodiment, with the exception of face plate 120 being wider in its width in order to cover all of the rocker switches 146 provided.

Mounting bracket 136 is structured similar to mounting bracket 36, with the exception of mounting bracket 136 being wider in its width in order to provide a plurality of openings 140 equal to the number of rocker switches 146 provided. Additionally, mounting bracket 136 is provided with a pressure absorption diverter bar 160 between each opening 140 and protruding outward from outer surface 141. Diverter bar 160 can also be constructed from a rigid epoxy, rigid plastic, castable plastic, etc. Furthermore, diverter bar 160 can be constructed integral with mounting bracket 136 or attached thereto by conventional means such as adhesives, hook and loop fasteners, tape, etc.

Diverter bar 160 protrudes outward at least slightly further than the rocker switches 146 which are adjacent each side of diverter bar 160. Preferably, diverter bar 160 does not protrude as far outward as pegs 38 so not to interfere with the attachment of face plate 120 to mounting bracket 136 by the insertion of pegs 38 within female receiving ports 34.

Diverter bar 160 allows for the on or off operation of a singular rocker switch 146 without affecting the other rocker switches. Thus, pressure bar 160 absorbs pressure placed on face plate 120 so that only the intended switch is turned either on or off as desired. Though not shown, it is to be understood that a diverter bar 160 can be provided on mounting bracket 146 between each pair of rocker switches 146 where more than two rocker switches are provided.

Figure 8:
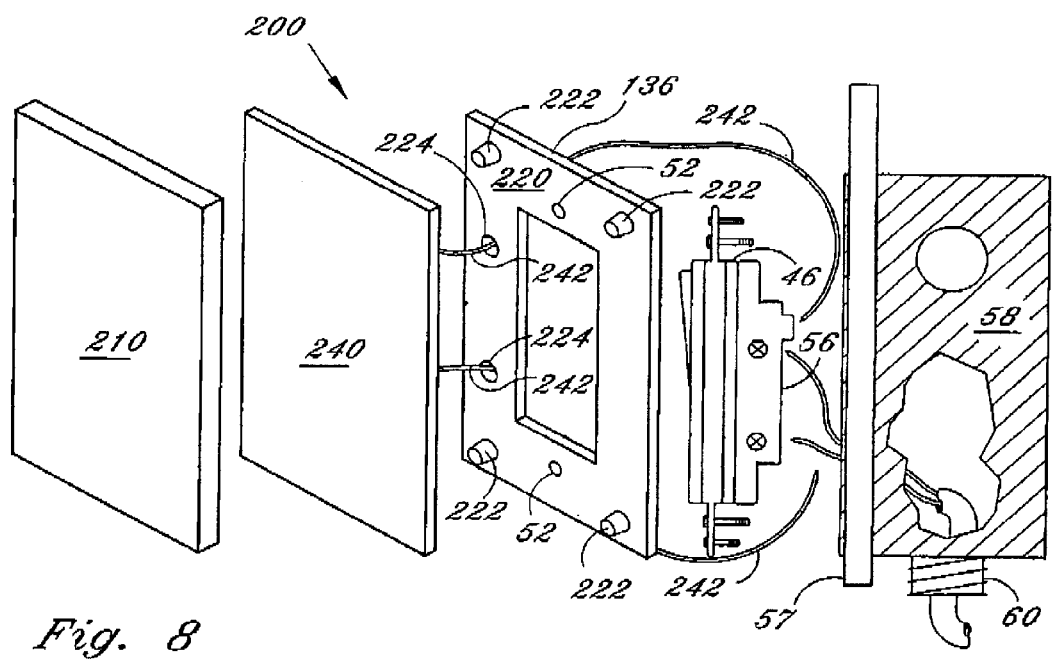
FIG. 8 illustrates an exploded view of a third embodiment light switch cover in accordance with the present invention.

FIGS. 8 through 10 illustrate a third embodiment of the present invention wherein the light switch cover is generally designated as reference numeral 200. In this embodiment, light switch cover 200 is generally provided with a face plate 210, mounting bracket 220, and electroluminescent lighting sheet or panel 240.

Electroluminescent lighting sheet 240 highlights or enhances a design disposed on an outer surface of face plate 210, or itself can be a lighting effect design in lieu of a design on the outer surface of face plate 210. Additionally, a screen print design can be directly applied to lighting sheet 240, as well as face plate 210. Where a screen print design is applied to lighting sheet 240, face plate 210 can merely be a clear cover. Lighting sheet 240 can provide cool, bright, uniform panels of light which can create a combination of various colors of light or a single color depending on the user's preference. Lighting sheet 240 can also be constructed to provide light patterns in an endless amount of shape configurations. Lighting sheet 240 will not de-laminate in use and the tiny lamps associated with sheet 240 are highly resistant to moisture and humidity. Lighting sheet 240 provides a cool light so not to affect face plate 210.

Lighting sheet 240 can be disposed between the female receiving ports of face plate 210. Lighting sheet 240 includes a pair of wires 242 which are conventionally connected to switch box 56 to energize lighting sheet 240. Wires 242 are fed from lighting sheet 240 through apertures 224 of mounting bracket 220 to switch box 56. To provide a larger lighting sheet 240, the female ports associated with face plate 210 can be disposed on the back surface of lighting sheet 240, allowing lighting sheet 240 to be snugly inserted in the area defined by the lip members of face plate 210.

Furthermore, in lieu of providing the female ports on lighting sheet 240 (which would mate with protruding pegs 222), an additional attachment sheet 260 (FIG. 10), having female ports 262 on its outer surface can be provided. Attachment sheet 260, as well as lighting sheet 240, are constructed from a soft material, in order to operate covered rocker switch 46. Attachment sheet 260 is provided with apertures 266 for feeding therethrough of wire 242 coming from lighting sheet 240.

Face plate 210 can have a lip member, defining a mating groove, extending around it periphery, similar to the lip member of face plate 20 (FIG. 1). Alternatively, in lieu of face plate 210 having lip members, attachment sheet 260 can be provided with lip members around its periphery which define a groove for mating with the outer flange member of the bracket member.

Lighting sheet 240 is sandwiched between face plate 210 and attachment sheet 260, and attachment sheet 260 is attached to face plate 210 by conventional means such as silicone. Once attachment sheet 260 is attached, wires 242 protrude out of apertures 266 and female ports 262 mate with protruding peg members 222 of mounting bracket 220. Prior to attaching mounting bracket 220 to electrical box 58, wires 242 are routed through apertures 224 of mounting bracket 220 and connected to switch box 56. Once wires 242 are properly attached, mounting bracket 220 is attached to electrical box 58, as previously described above for the first embodiment of the present invention.

Face plate 210 and mounting bracket 220 can be provided with a lip/groove member and outer flange member, respectively, which are similar in construction and operation to the lip and flange members described for the first embodiment of the present invention. Additionally, the other features of light switch cover 200, not discussed, are similar to those discussed above for the first embodiment of the present invention.

Similar to the second embodiment of the present invention, a light switch cover assembly, including an electroluminescent lighting sheet can also be utilized where more than one rocker switch is provided. Where more than one rocker switch is provided, the lighting sheet is larger in width as compared to lighting sheet 240 and the length of its width is dependent on the number of rocker switches provided. Additionally, a diverter bar, as described above, is provided. Also, the safety attachment of a mounting bracket outer flange and flange groove member, as described above, can also be provided for all of the embodiments of the present invention. Furthermore, where an attachment sheet is utilized, the attachment sheet is larger in width than attachment sheet 260 and the length of its width is dependent on the number of rocker switches provided.

Wires 242 can be connected to switch box 56, by conventional means, so that when rocker switch 46 is in an "off" position, lighting sheet 240 is illuminated and when rocker switch 46 is in an "on" position, lighting sheet 240 is off. Lighting sheet 240 can have a useful life of one hundred thousand (100,000) hours and can be wired to 110 Volts AC.

Figure 11:
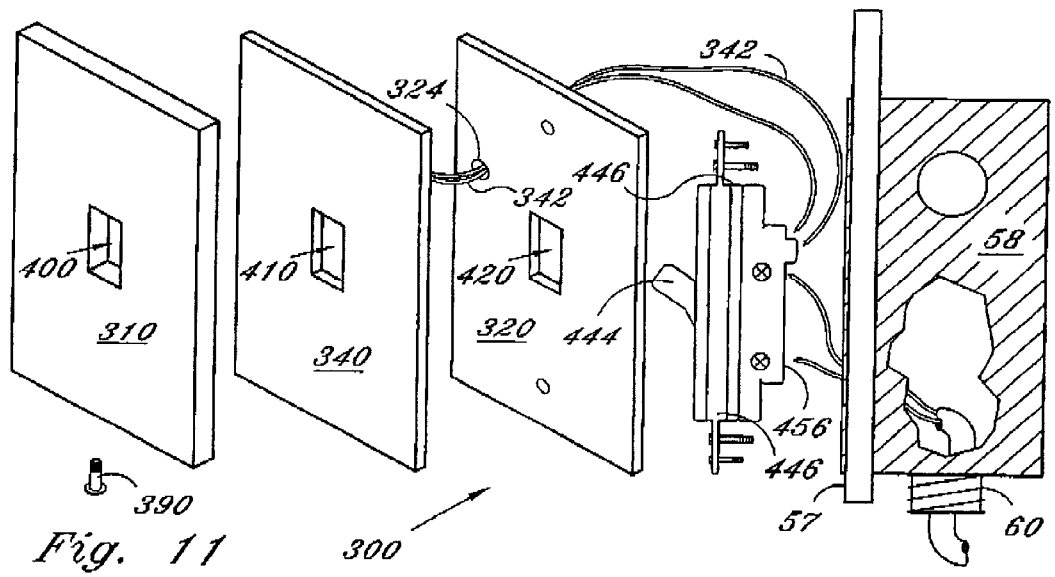
FIG. 11 illustrates an exploded view of an alternate embodiment light switch cover for use with a toggle switch in accordance with the present invention.

FIGS. 11 through 13 illustrate an alternate embodiment of the present invention, for utilization with a "toggle" type switch, wherein the light switch cover is generally designated as reference numeral 300. In this embodiment, light switch cover 300 is generally provided with a face plate 310, mounting bracket 320, and electroluminescent lighting sheet or panel 340. Face plate 310, mounting bracket 320, and electroluminescent lighting sheet or panel 340, include apertures 400, 410, and 420, respectively, to receive toggle 444 of toggle switch 446. Toggle switch 446 is connected to switch box 456 which mounts in electrical box 58 in a similar manner to the other embodiments described herein above.

Electroluminescent lighting sheet 340 highlights or enhances a design that can be disposed on an outer surface of face plate 310, or itself can be a lighting effect design in lieu of a design on the outer surface of face plate 310. Additionally, a screen print design can be directly applied to lighting sheet 340, as well as face plate 310. Where, a screen print design is applied to lighting sheet 340, face plate 310 can have, in at least a portion, a clear cover. Lighting sheet 340 can provide cool, bright, uniform panels of light which can create a combination of various colors of light or a single color depending on the user's preference. Lighting sheet 340 can also be constructed to provide light patterns in an endless amount of shape configurations. Lighting sheet 340 will not de-laminate in use and the tiny lamps associated with sheet 340 are highly resistant to moisture and humidity. Lighting sheet 340 provides a cool light so not to affect face plate 310.

Lighting sheet 340 includes a pair of wires 342 which are conventionally connected to switch box 456 to energize lighting sheet 340. Wires 342 are fed from lighting sheet 340 through aperture 324 of mounting bracket 320 to switch box 456. Lighting sheet 340 can be snugly inserted in the area defined by the perimeter lip members of face plate 310.

The perimeter lip members of face plate 310 define a mating groove 335, as seen in FIG. 12, extending around the periphery of plate 310, similar to the lip members of face plate 20 (FIG. 1), for mating with the outer flange member 343 of mounting bracket 320. Face plate 310 can have a rigid perimeter area 380, as seen in FIG. 13. Set screw 390 can be used to secure face plate 310 firmly to mounting bracket 320, as seen in FIG. 12.

Lighting sheet 340 is sandwiched between face plate 310 and mounting bracket 320. Prior to attaching mounting bracket 320 to electrical box 58, wires 342 are routed through aperture 324 of mounting bracket 320 and connected to switch box 456. Once wires 342 are properly attached, mounting bracket 320 is attached to electrical box 58, as previously described above for the first embodiment of the present invention.

Face plate 310 and mounting bracket 320 can be provided with a lip/groove member 335 and outer flange member 343, respectively, which are similar in construction and operation to the lip and flange members described for the first embodiment of the present invention. However, face plate 310 can have a rigid perimeter frame portion 380 that can utilize set screw 390 to securely attach face plate 310 to mounting bracket 320. The other features of light switch cover 320, not discussed, are similar to those discussed above for the first embodiment of the present invention.

Similar to the second embodiment of the present invention, a light switch cover assembly, including an electroluminescent lighting sheet can also be utilized where more than one toggle switch is provided. Where more than one switch is provided, the lighting sheet is larger in width as compared to lighting sheet 340, and its width, as well as the number of apertures 410, is dependent on the number of toggle switches provided. A diverter bar, as described above, is not required when using toggle switches.

Wires 342 can be connected to switch box 456, by conventional means, so that when toggle switch 446 is in an "off" position, lighting sheet 340 is illuminated and when rocker switch 446 is in an "on" position, lighting sheet 340 is off. Lighting sheet 340 can have a useful life of one hundred thousand (100,000) hours and can be wired to 110 Volts AC.

The attachment of a face plate having a rigid frame or perimeter to the mounting bracket outer flange, by a flange groove member and set screw, as described above, can be provided for all of the embodiments of the present invention. For example, mounting bracket 136', shown in FIG. 14 is essentially mounting bracket 136 of the second embodiment of the present invention, as described and shown in FIG. 6, but without ports 34. The other features of mounting bracket 136' are the same as mounting bracket 136, and have been designated using the same reference numerals with a prime (') attached. Attachment of mounting bracket 136' and a switch cover to a rocker switch, in accordance with the present invention, follows the description herein above for the embodiment utilizing a toggle switch as described and shown in FIGS. 11–13.

The present invention provides a light switch cover which includes a lighted a safety device, and that permits the user to utilize the covered light switch. Furthermore, the present invention allows an individual to continue to use a covered light switch without having the light switch itself exposed and part of the design. Preferably, the present invention is installed by a certified electrician for safety purposes, or at least by a competent individual who carefully follows installation instructions. In all embodiments of the present invention, no modification of how the switch is attached to the electrical box is necessary. The mounting bracket, for all embodiments, is attached to the switch, normally where a conventional plate member is attached.

It should also be understood, that the present invention can be utilized with other receptacles and light switches, such as plug receptacles, in addition to its preferred use with "rocker" and "toggle" type switches.

Figure 15:
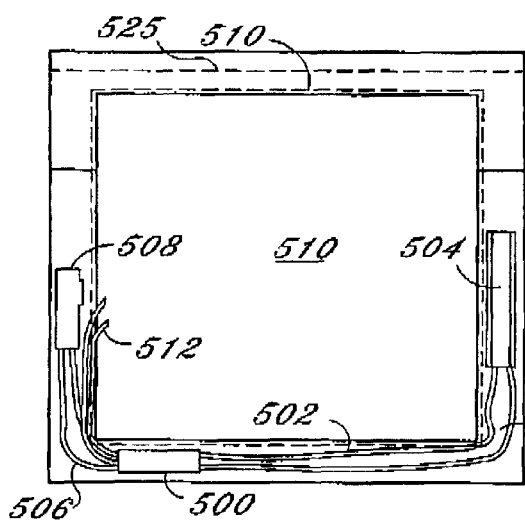
FIG. 15 is a rear elevational view showing the battery back-up and sensing circuit of the present invention.

Referring now to FIG. 15, a battery back-up and sensing circuit, for use with all of the embodiments of the present invention, illuminates the switch plate whenever power to the light switch is interrupted. Sensing circuit 500 is connected by wires 502 to battery 504, and by wires 506 to microswitch 508. Sensing circuit 500 includes a power inverter to illuminate, for example, electroluminescent lighting sheet 510, through wires 512.

As discussed herein above for the other embodiments of the present invention, lighting sheet 510 can serve as a flexible cover to operate one or more rocker switches or be configured to operate toggle switches or plug receptacles, and may include a decorative appearance or can be plain. Lighting sheet 510 can be made as a single electroluminescent sheet or can be a laminate of an electroluminescent sheet and a clear membrane.

A suitable sensing circuit 500 can be obtained from Capital Asset Engineering, 10650 72nd. St., Largo, Fla. 33777. The device from Capital Asset Engineering is approximately 1.645 inches long, 0.4 inches high, and 0.9 inches wide, and can convert 3, 6, 9, or 12 volts DC into AC in the range from about 60 volts AC to about 300 volts AC, and can provide frequencies in the range of about 100 hertz to about 1600 hertz. Preferably, a 3 VDC battery will be used and converted to 90 volts AC at a frequency of 600 Hz and a blink rate of 2 times per second.

It should be recognized by one of ordinary skill in the art, that other comparable power loss sensing and inverter circuits can be substituted for the Capital Asset Engineering device described above.

Whenever power is lost to the lighting switch, microswitch 508 is activated to deliver battery power to the inverter contained within circuit 500. Circuit 500 then delivers inverted battery power to operate lighting sheet 510. Sheet 510 can be set to illuminate steadily or can blink on and off at a preselected frequency, as described above.

Battery 504 can be any number of selected batteries, but preferably is a lithium based battery to provide a compact battery with extended battery life.

Battery 504, circuit 500, and switch 508 are preferably sized to fit within a rigid perimeter framework 514, and within the perimeter framework of the alternate embodiments described herein above. Alternately, battery 504, circuit 500, and switch 508 can be attached to, or behind, the mounting bracket of any of the embodiments herein described above that do not use a rigid framework. Lighting sheet 510 can be disposed within a recess in perimeter framework 514 as shown in FIG. 15. As stated above, lighting sheet 510 can be replaced by any of the embodiments as described herein above. Hence, the battery back-up and sensing circuit can be utilized with any of the embodiments of the present invention.

Figure 16:
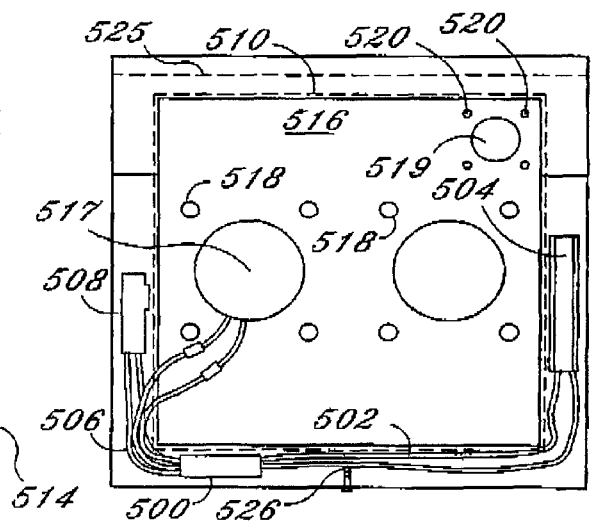
FIG. 16 is a rear elevational view showing the battery back-up and sensing circuit, and the pressure sensitive switches of the present invention.

Referring now to FIG. 16, another embodiment of the present invention is shown when using one or more pressure sensitive or "domed" light switches, and the battery back-up and sensing circuit as described above. In this embodiment, one or more pressure sensitive dome switches, shown as two in FIG. 16, are used in place of rocker or toggle type switches, and are mounted in a manner similar to the rocker and toggle switches discussed herein above.

A membrane 516, which may be flexible, can have one or more apertures 517 (shown here with two) to receive one or more pressure sensitive switches (not shown). Membrane 516 can be permanently laminated to an electroluminescent sheet such that membrane 516 and the electroluminescent sheet become essentially one piece. Membrane 516 is disposed within a recess in perimeter framework 514 as shown in FIG. 16. The exterior appearance of membrane 516 or sheet 510 can be decorative or plain.

A plurality of spaced female receiving ports 518 can be included to mate with pegs similar to pegs 38 and 222 of the embodiments described above, to provide support around the pressure sensitive switches. Additionally, a diverter bar similar to diverter bar 160 described above can be used in conjunction with the pressure sensitive switches.

Included in FIG. 16 is an aperture 519 for an on/off switch for the light switch cover of the present invention, which can be used to manually turn the illumination of the light switch cover of the present invention off. In this embodiment, aperture 519 provides access to a pressure sensitive on/off switch (not shown), however, the on/off switch can be a toggle switch or a rocker type switch, and would include associated wiring for operation. Hence, the on/off switch for the illuminated light switch cover, shown in FIG. 16 in an embodiment using pressure sensitive switches, can be utilized with any of the embodiments described herein above that include the battery back-up and sensing circuit.

In operation, if power to the light switch is lost, the battery back-up and sensing circuit respond by illuminating the switch cover as described above. The on/off switch can then be utilized to manually turn the illuminated switch cover off.

A plurality of female receiving ports 520, can be provided in membrane 516 to receive corresponding pegs to provide support around the light switch cover on/off switch.

Figure 17:
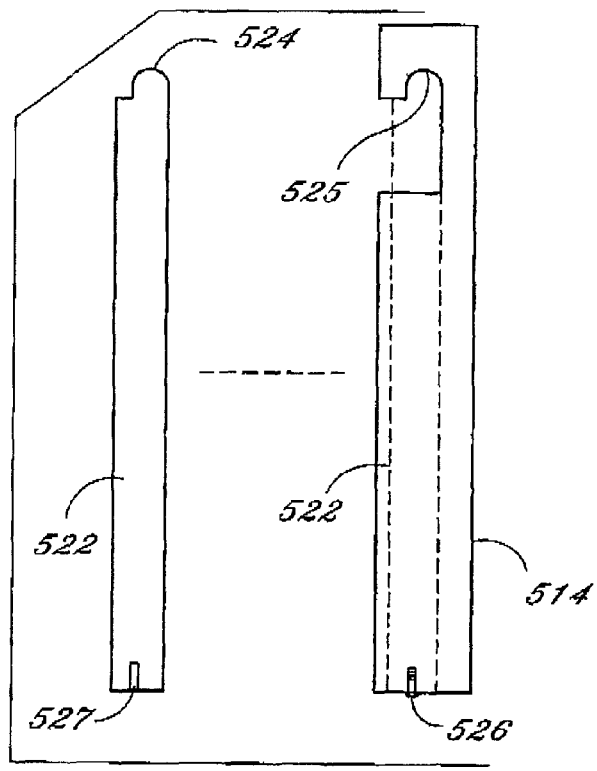
FIG. 17 is a partially exploded side elevational view of one embodiment of the present invention.

Referring now to FIG. 17, a mounting bracket 522 is shown having a shaped, in this case a domed or convex, protrusion 524. Mounting bracket 522 is attached to an electrical switch box in the manner as described herein above for the other embodiments of the invention. Frame 514 includes a shaped recess 525 that receives protrusion 524. To mount frame 514, set screw 526 is at least partially removed, recess 525 on frame 514 is set over protrusion 524 on bracket 522. Frame 514 is then slid over bracket 522 aligning set screw 526 with aperture 527. Set screw 526 is then tightened, locking frame 514 onto bracket 522.

Mounting bracket 522 can include a plurality of protruding pegs (not shown) that correspond to the female receiving ports 518 and 520, or that correspond to the female receiving ports that may be on other embodiments described herein above. Mounting bracket 522 is shown in FIG. 17 without pegs for use with the embodiment shown in FIG. 15.

Figure 18:
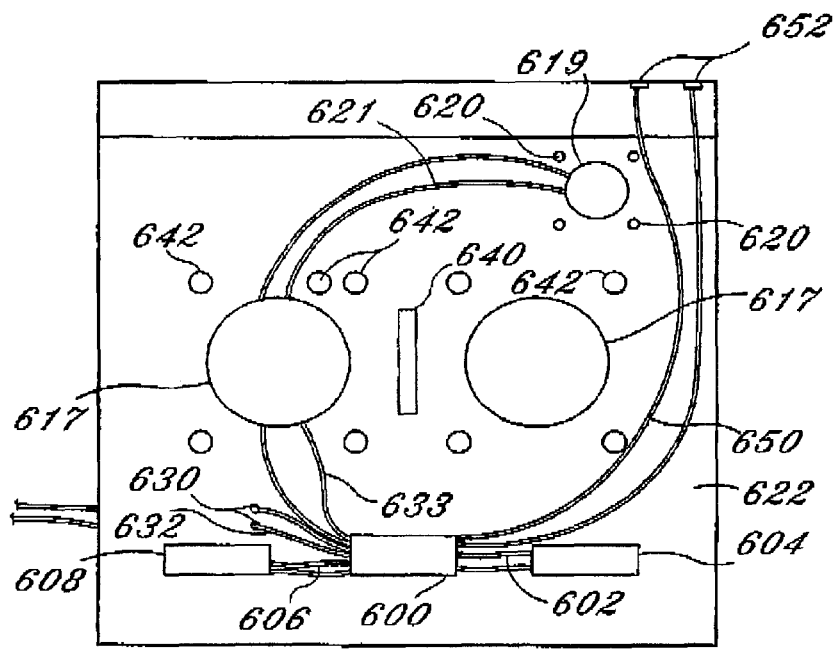
FIG. 18 is front elevational view showing the battery back-up and sensing circuit attached to the mounting bracket as an additional embodiment of the present invention.
Figure 19:
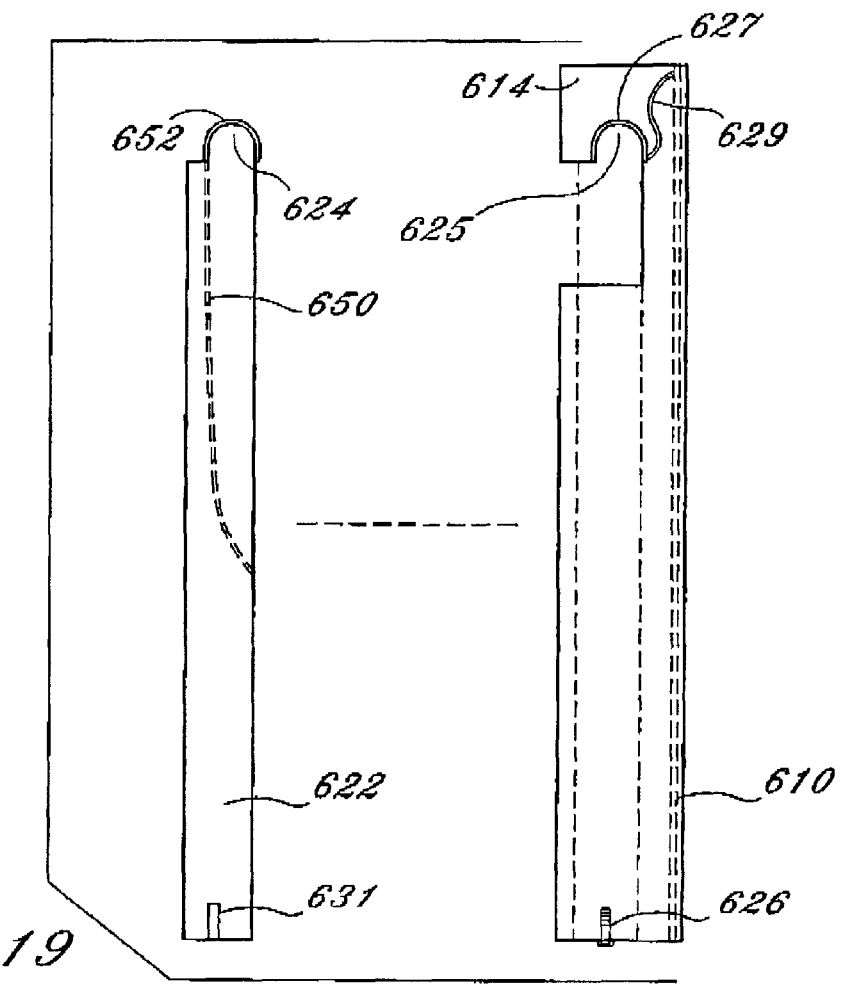
FIG. 19 is an exploded side elevational view illustrating the mounting bracket and outer frame member of the additional embodiment of the present invention.

A further embodiment of the present invention is illustrated in FIGS. 18 and 19. The battery back-up and sensing circuit for this embodiment, discussed below, operates similar to the embodiment illustrated in FIGS. 15 through 17. However, such circuit is disposed in a different location for the embodiment of FIGS. 18 and 19.

Sensing circuit 600 is connected by wires 602 to battery 504, and by wires 606 to microswitch 608. Sensing circuit 600 includes a power inverter to illuminate, for example, electroluminescent lighting sheet 610, discussed below, which can be disposed within outer frame 614.

As discussed herein above for the other embodiments of the present invention, lighting sheet 610 can serve as a flexible cover to operate one or more rocker switches or be configured to operate toggle switches or plug receptacles, and may include a decorative appearance or can be plain. Furthermore, sheet 610 can serve as a flexible cover to operate one or more pressure sensitive or push button on/off switches 617.

Lighting sheet 610 is made as a single electroluminescent sheet or can be a laminate of an electroluminescent sheet.

As stated above, a suitable sensing circuit 600 can be obtained from Capital Asset Engineering, 10650 72nd. St., Largo, Fla. 33777. The device from Capital Asset Engineering is approximately 1.645 inches long, 0.4 inches high, and 0.9 inches wide, and can convert 3, 6, 9, or 12 volts DC into AC in the range from about 60 volts AC to about 300 volts AC, and can provide frequencies in the range of about 100 hertz to about 1600 hertz. Preferably, a 3 VDC battery will be used and converted to 90 volts AC at a frequency of 600 Hz and a blink rate of 2 times per second.

It should be recognized by one of ordinary skill in the art, that other comparable power loss sensing and inverter circuits can be substituted for the Capital Asset Engineering device described above.

Sensing circuit 600, battery 604 and microswitch 608 are attached to mounting bracket 622 by any conventional means such as barrel connectors or other connectors, clips, adhesive, etc. Preferably, cutouts will be provided in mounting bracket 622 for disposal of the individual elements. A pair of apertures 630 can be provided through mounting bracket 622 for insertion therethrough of wires 632 which run from the electrical box (not shown, but conventional) to sensing circuit 600.

Where more than one switch is provided a diverter bar 640, similar to those previously discussed, may be provided. Furthermore, ports or pegs 642 can be provided on mounting bracket 622 to mate with pegs or ports (not shown), respectively, disposed on the inner surface of sheet 610. The ports and pegs function similar to those discussed above for the other embodiments. A pair of wires 650 runs from sensing circuit to a first pair of positive and negative contacts 652. Lighting sheet 610 can be disposed within a recess in perimeter framework 614, similar to the embodiment shown in FIG. 15. As stated above, lighting sheet 610 can be replaced by any of the embodiments as described herein above.

Referring now to FIG. 19, mounting bracket 622 is shown having a shaped, in this case a domed or convex, protrusion 624. Contacts 652 are disposed on a portion of protrusion 624. Mounting bracket 622 is attached to an electrical switch box in the manner as described herein above for the other embodiments of the invention. Frame 614 includes a shaped recess 625, which includes a second pair of positive and negative contacts 627, and receives protrusion 624. When protrusion 624 is properly received within recess 625 contacts 652 and 627 are mating. A pair of wires 629 run from second set of contacts 627 to sheet 610.

Similar to the embodiment shown in FIGS. 15-17, to mount frame 614, set screw 626 is at least partially removed, and recess 625 on frame 614 is set over protrusion 624 on bracket 622. Frame 614 is then slid over bracket 622 aligning set screw 626 with aperture 631 on mounting bracket 622. Set screw 626 is then tightened, locking frame 614 onto bracket 622. Furthermore, communication is provided between contacts 652 and contacts 627.

Referring now to FIG. 18, the present invention is shown for use with one or more pressure sensitive or push button on/off light switches, and the battery back-up and sensing circuit as described above. In this embodiment, switches 617 are positioned through apertures (not shown, but which correspond to the shape of a portion of the associated switch 617) of mounting bracket 622 and attached to mounting bracket 622 by conventional such as screws, bolts, etc. Thus, the switches are mounted to bracket 622 in a manner similar to the rocker and toggle switches discussed herein above.

Sheet 610 is disposed within a recess (not shown) in the perimeter of framework 614. The exterior appearance of the sheet 610 can be decorative or plain. Included in FIG. 18 is an additional aperture in mounting bracket 622 for positioning of an on/off switch 619 for the light switch cover of the present invention, which can be used to manually turn the illumination of the light switch cover of the present invention off. Switch 619 is preferably a low voltage pressure sensitive switch. A plurality of female receiving ports 620, can be provided on mounting bracket 622 to receive corresponding pegs to provide support around on/off switch 619.

Wires 621 run from on/off switch 619 protruding through its corresponding aperture to switch 617 protruding through its corresponding aperture. Furthermore, wires 632 run from sensing circuit 600 also to switch 617. On/off switches 617 and 619 can be pressure sensitive or of push button type, or a rocker type switch, and include associated wiring for operation. Hence, the on/off switch for the illuminated light switch cover, shown in FIG. 18 in an embodiment using pressure sensitive switches, can be utilized with any of the embodiments described herein above that include the battery back-up and sensing circuit.

Whenever power is lost to the conventional lighting circuitry, microswitch 608 is activated to deliver battery power to the inverter contained within circuit 600. Circuit 600 then delivers inverted battery power to contacts 652, through wire 650. As contacts 652 mate with contacts 627, the power travels through wire 629 to sheet 610 to operate lighting sheet 610. Sheet 610 can be set to illuminate steadily or can blink on and off at a preselected frequency, as described above.

As stated above, battery 604 can be any number of selected batteries, but preferably is a lithium based battery to provide a compact battery with extended battery life.

Thus, in operation, if power to the light switch is lost, battery back-up and sensing circuit 600 respond by illuminating the switch cover (sheet 610 in the final embodiment) as described above. On/off switch 619 can then be utilized to manually turn the illuminated switch cover off.

Figure 20:
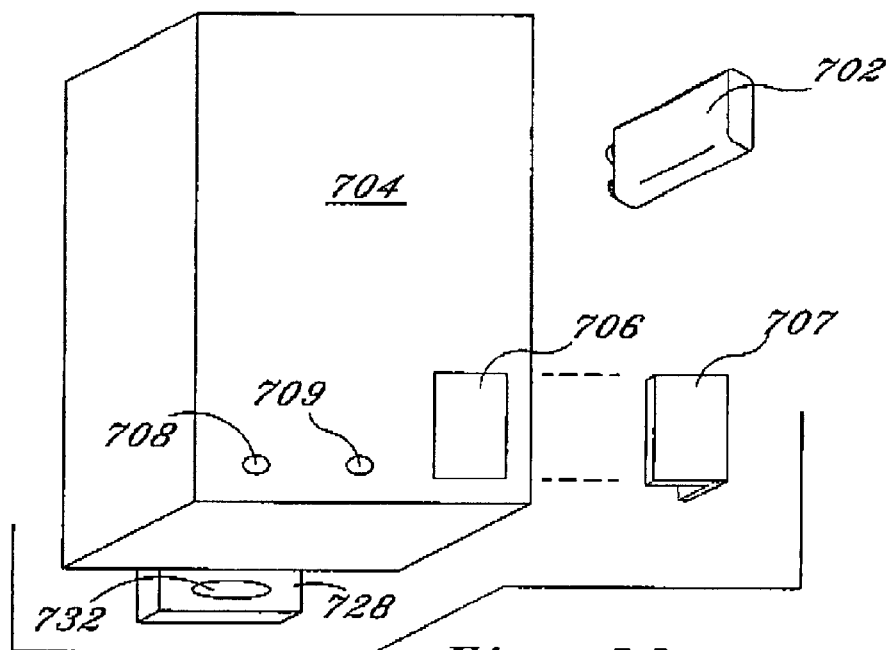
FIG. 20 is an exploded rear perspective view of yet another embodiment of the present invention.
Figure 21:
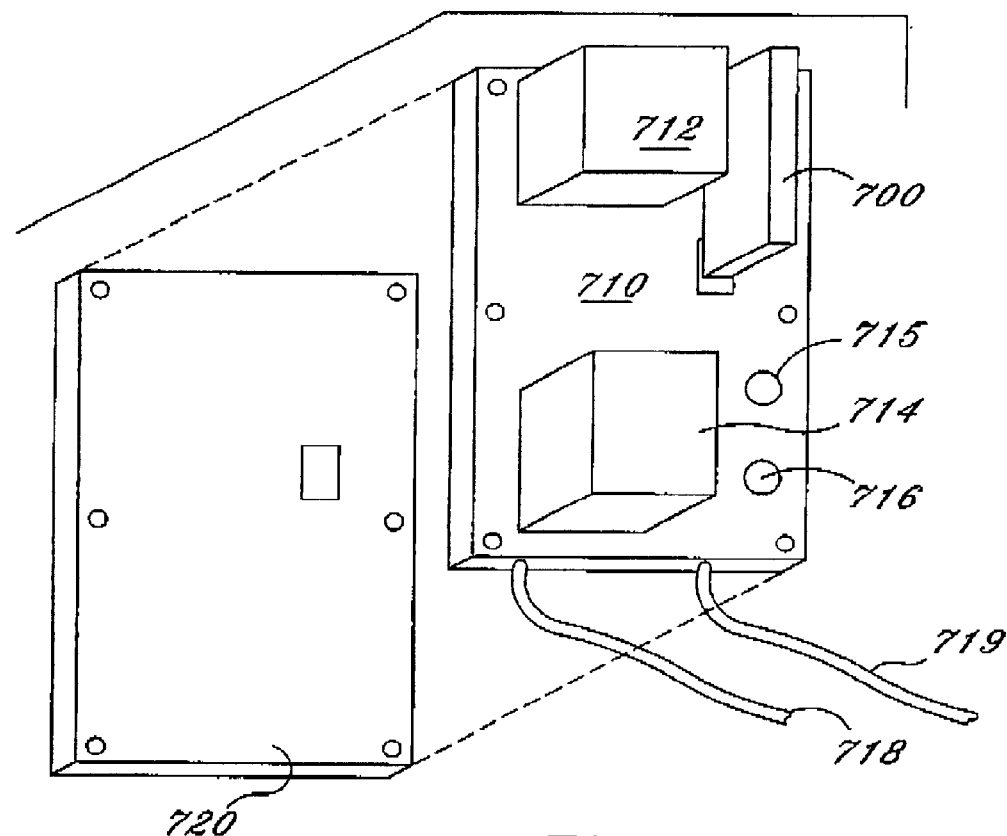
FIG. 21 is an exploded rear perspective view of the internal contents of the view illustrated in FIG. 20.

Referring to FIGS. 20 and 21, an alternate embodiment of the present invention is illustrated, including an alternate location shown for the battery back-up circuitry which includes sensing circuit 700 and battery 702. Sensing circuit 700 can be the same circuit as described herein above as circuit 500 and circuit 600 for embodiments previously described, or an alternate inverter circuit as known in the art.

As illustrated in FIG. 20, electrical box 704 can include an aperture 706 to receive battery 702. Aperture 706 can be enclosed by cover 707. Apertures 708 and 709 are sized to receive wires as further described herein below. Battery 702 is illustrated as a 9 volt battery, but can be any DC voltage battery such as 3V, 6V, 9V, 12V, and the like, and can be rechargeable with a built-in charging circuit such that periodic battery replacement is not required.

Referring to FIG. 21, sensing or inverter circuit 700, can convert any of the selected DC voltages to AC voltage, of greater than 90 volts at a frequency range of approximately 50 to 2000 hertz, to power an electroluminescent material, or light bulb, or other device as utilized herein, and can provide steady or flashing illumination.

Inverter circuit 700 is mounted to control printed circuit (PC) board 710. PC board 710 can include switching control circuitry 712, output control circuitry 714, battery terminals 715 and 716, and wires 718 and 719. Wires 718 and 719 can be replaced by terminal screws for attachment of user wires. Upon assembly, wires 718 and 719 are inserted through apertures 708 and 709 in box 704. Wires 718 and 719 are connected to house wiring for supplying typical house current as conventionally utilized for lights and other in-home appliances, which can be 110–120 volts AC or 220 volts AC.

A positive contact multi-switch PC board 720, can be connected to PC board 710, or alternately positive contact switches can be mounted directly to PC board 710. The switches can be any of the switch devices previously disclosed herein, and can include optional input devices such as timers, motion sensors, sound sensors, and the like. The switches mounted to PC board 720, or alternately directly on PC board 710, send command signals to switching and output control circuitry 712 and 714, to control the user's load, and the illumination of the cover plate lighting device. As previously described herein, the cover plate illumination can be activated whenever the light or other load is turned off, and the illumination can be deactivated whenever the light or other load is turned-on.

The switching and output control circuitry 712 and 714 can control standard user loads such as 15 or 20 amps, such as for lights, TVs, and other home appliances. Higher loads of up to approximately 100 amps are possible. Output control 714 can include relay contacts for 2-way and 3-way instant or time delayed on/off control, solid state controls such as TRIAC (AC switch), or silicon controlled rectifier (SCR) for variable output devices such as a dimmer, or other solid state controls for custom applications.

Figure 22:
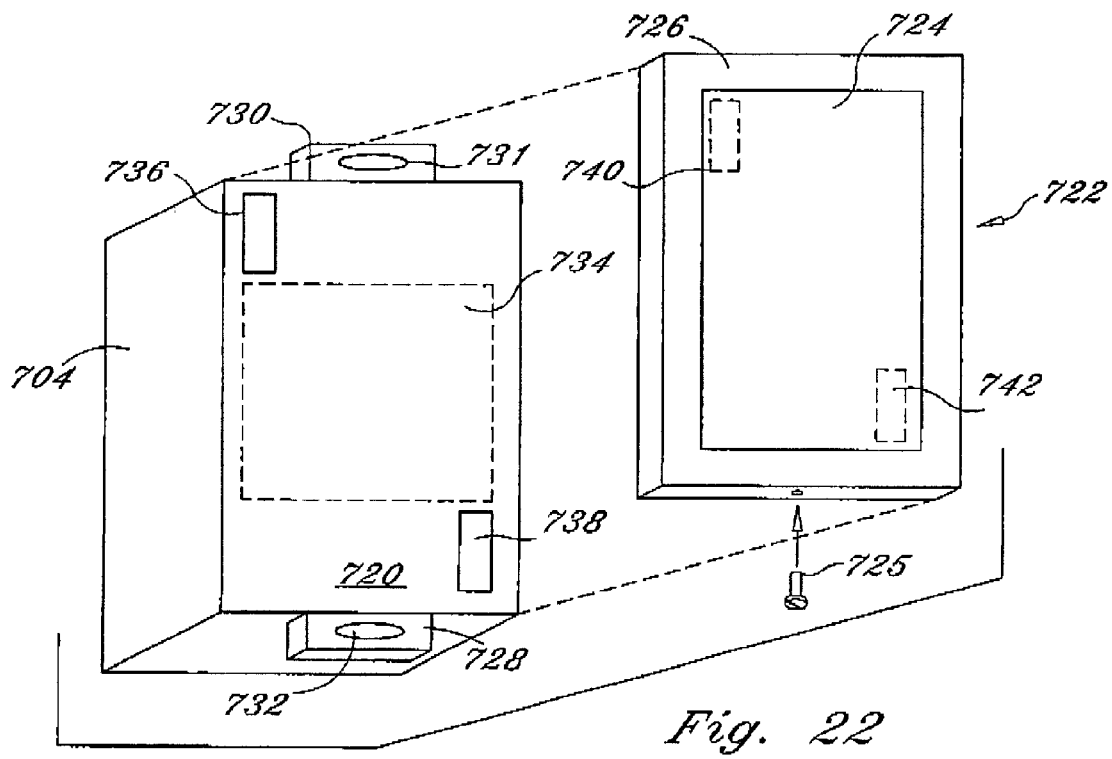
FIG. 22 is an exploded front perspective view of the embodiment of FIGS. 20 and 21.

Referring to FIG. 22, one embodiment of cover plate 722 includes electroluminescent lite 724 held within frame 726.

Frame 726 can be any of the frames as described in the embodiments herein above, and can be made of a suitable plastic material. Frame 726 can be attached to the front of box 704 and held in place by set screw 725. Mounting tabs 728 and 730 can be attached to a conventional wall box receiving device by conventional screws passing through apertures 731 and 732, in conventional manner. Front multi-switch PC board 720, which alternately could be PC board 710, includes switch area 734, and spring-loaded contacts 736 and 738. Contacts 736 and 738 extend upward of front PC board 720 and make contact with socket pad areas 740 and 742, which are utilized in place of electrical wires as illustrated on embodiments heretofore described. At least one of contacts 736 and 738 can include a switch which activates the power being supplied to electroluminescent lite 724. Therefore, unless cover 722 is in place on box 704 depressing spring-loaded contacts 736 and 738, power will not be supplied at contacts 736 and 738.

The embodiment described above and in FIGS. 20–22 comprises an AC switching device for switching AC power to nearly any output load. Input control to the switching device can be via manual switches, motion, sound, or other input mechanism.

In operation, the device or devices to be switched, which can include any of the devices described herein above, is connected to output control 714. Switching control is then accomplished via one or more preselected switches connected to input switching control PC board 710. A separate multi-switch PC board 720, which can include a plurality of switches, can be mounted to PC board 710. The switches can include any of the switching devices discussed herein above.

For example, the output device may be a wall outlet connected to a lamp. The switch can be a manual switch, such as pressure sensitive push-button switch. Alternately, the output device could be an alarm, and the switch could be a motion sensor, or a audio sensor. Multiple output devices and switches can be utilized with each electroluminescent lighting sheet.

Figure 23:
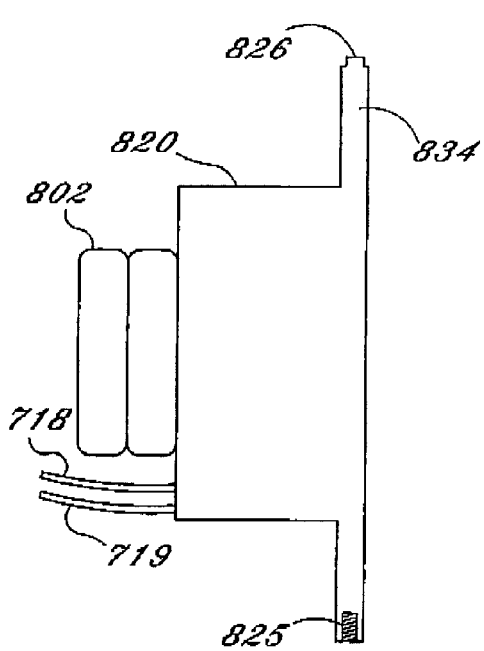
FIG. 23 is a side elevational view of a preferred embodiment of that shown in FIGS. 20 through 22.
Figure 24:
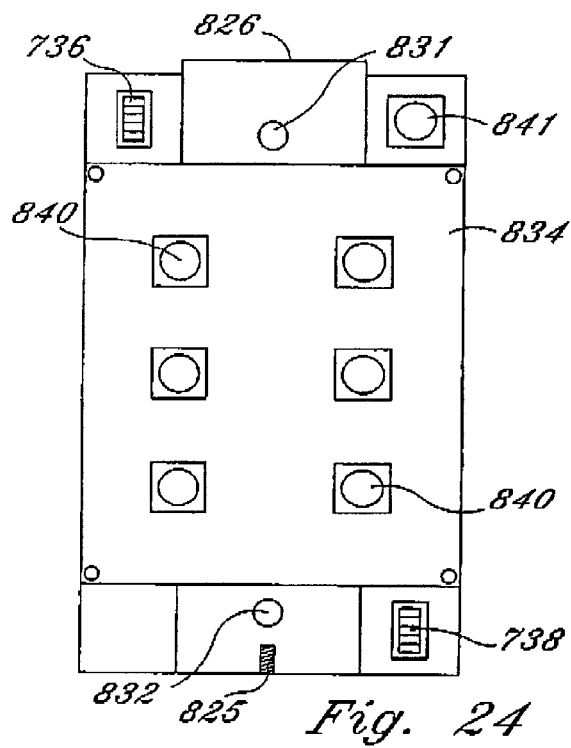
FIG. 24 is front elevational view of that of FIG. 23.
Figure 25:
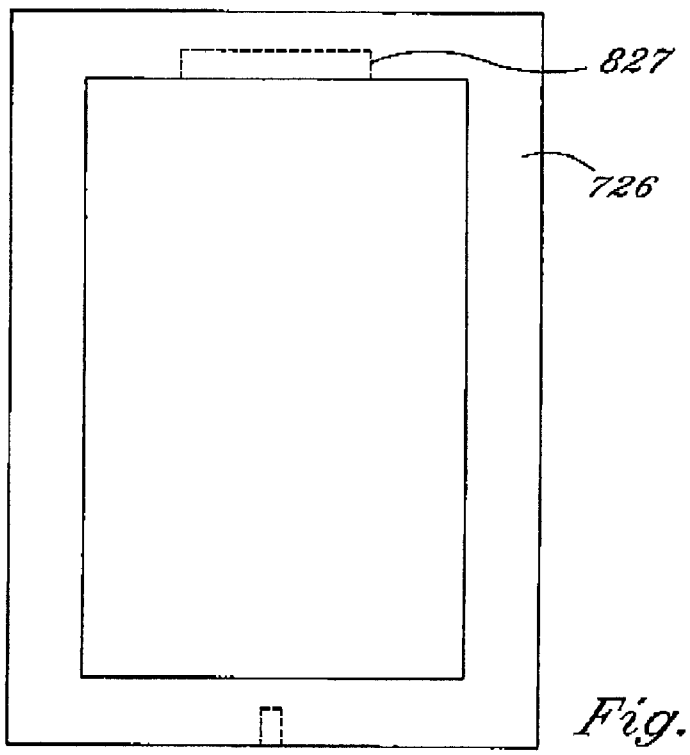
FIG. 25 is a front elevational view of the cover of the embodiment of FIGS. 23 and 24.

Referring to FIGS. 23–25, a preferred embodiment of that shown in FIGS. 20–22, is illustrated, with identical components having the same reference numerals. Referring to FIG. 23, batteries 802 are preferably rechargeable NiCad batteries mounted to the rear of box 820. Box 820 includes front plate 834 which has screw socket 825 on one end and shoulder 826 on the opposite end, as seen in FIGS. 23 and 24.

Referring to FIG. 24, plate 834 includes spring loaded contacts 736 and 738, one or more tactile switches 840, and electroluminescent lighting sheet on/of switch 841. Spring loaded contacts 736 and 738 include a jumper connection provided by the electroluminescent lighting sheet that prevents the contacts from being energized unless the electroluminescent lighting sheet is in place. In other words, on/off switch 841 will not energize contacts 736 and 738 unless lighting sheet 724 is in place.

Box 820 is mounted to a wall via conventional fasteners through apertures 831 and 823, or by other suitable manner.

Figure 26:
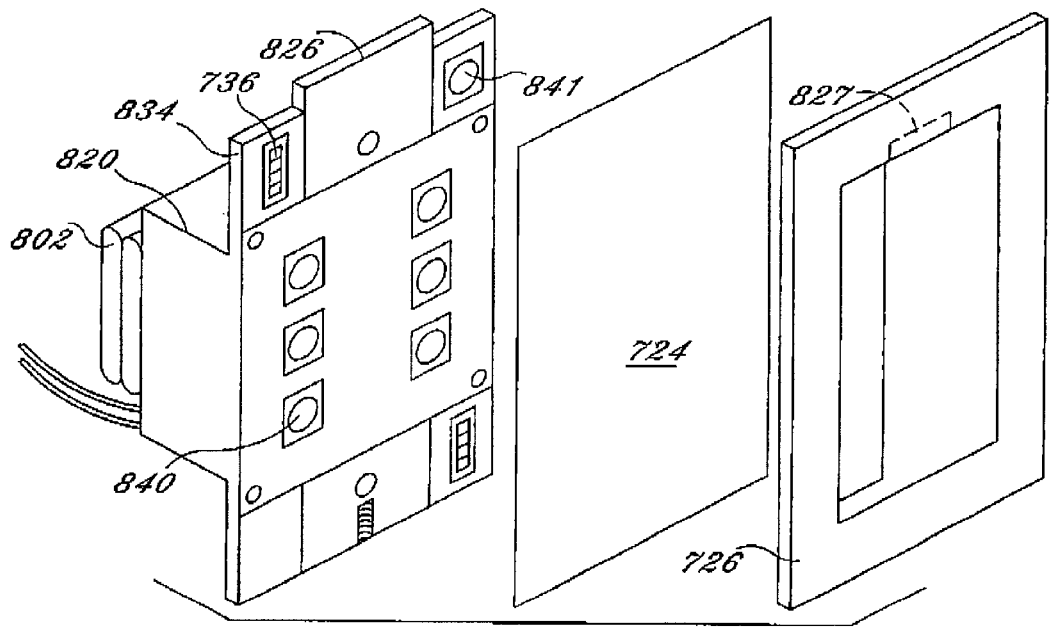
FIG. 26 is an exploded perspective view of that shown in FIGS. 23, 24, and 25.

Shoulder 826 fits into recess 827 on frame 726, as shown in FIG. 25. FIG. 26 illustrates an exploded assembly of the embodiment of FIGS. 23–25. To assemble, sheet 724 is placed within frame 726, and recess 824 of frame 726 is set onto shoulder 826. Frame 726 is then pressed against the front of plate 834 and set screw 725 is secured into socket 825. Switches 840 and switch 841 are then accessible through flexible electroluminescent sheet 724.

As illustrated in FIGS. 23–26, six switches 840 are illustrated, but could be any number from one to six or more.

Switches 840 are used to switch any preselected load as described herein above. Switches 840 could be replaced with nearly any type of switching device including motion sensors, audio sensors, and the like. Switch 841 turns electroluminescent lighting sheet 724 "on" and "off".

Figures 27, 28:
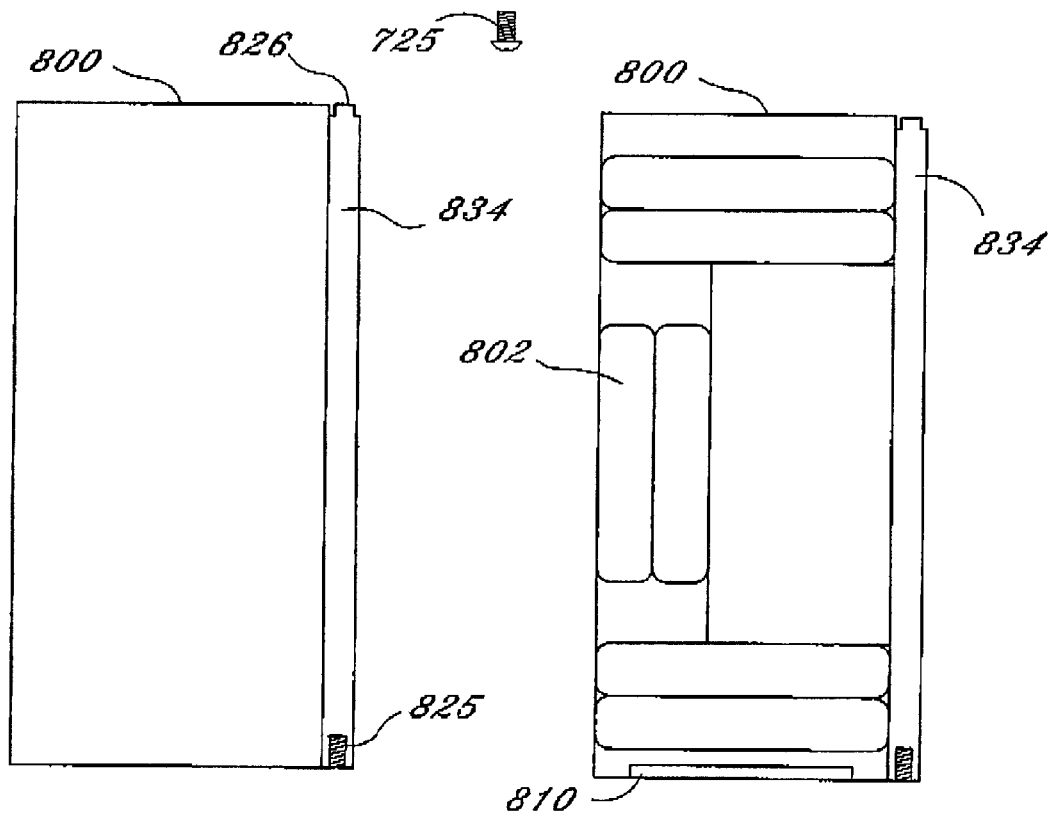
FIG. 27 is a side elevational view of a portable embodiment of the present invention.
FIG. 28 is a side elevational view partially cut-away of that of FIG. 27.
Figure 29:
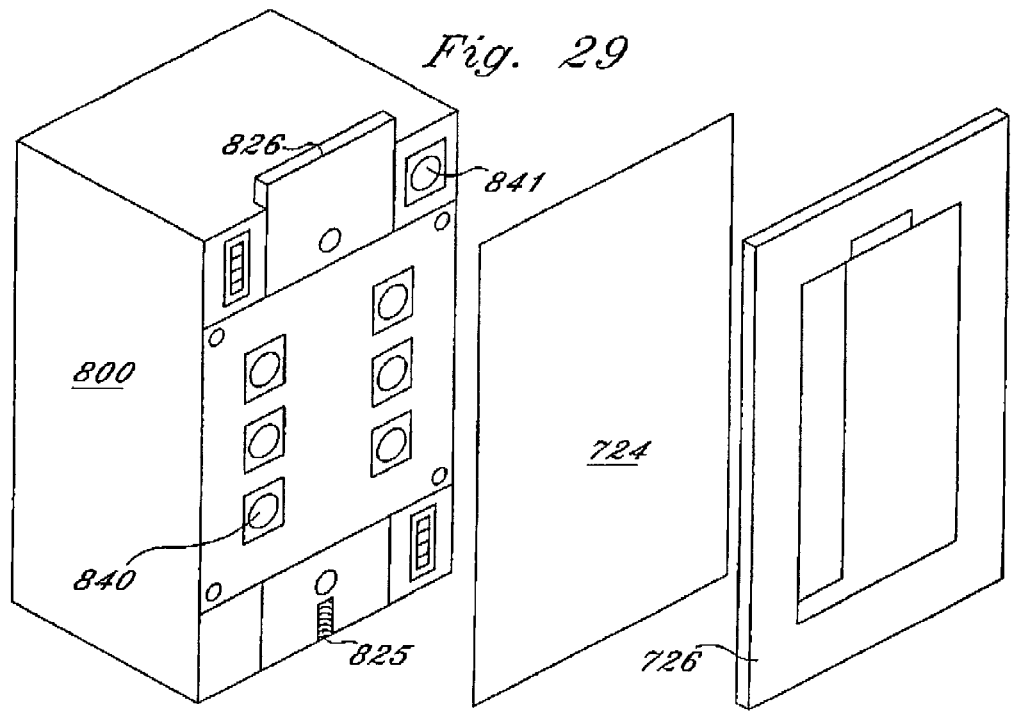
FIG. 29 is an exploded perspective view of that of FIGS. 27 and 28.

Referring to FIGS. 27, 28, and 29, a portable version of the embodiment shown in FIGS. 23–26 is illustrated having enclosure 800, which covers the rear of the invention and a plurality of batteries 802. In the portable embodiment, AC power may not be available for recharging of batteries 802. A solar cell 810 can be used for recharging batteries 802. In addition, batteries 802 can be charged from a DC source, such as a cigarette lighter adapter for interface to an automobile. The additional batteries 802 can provide sufficient power to energize electroluminescent sheet 734 for approximately 24 hours or longer.

The enclosure 800 is preferably a waterproof enclosure that can include a conventional gasket or seal (not shown) to prevent water entry into the battery compartment or rear of plate 834. The enclosure can be plastic and can be buoyant enough such that the portable embodiment floats.

The portable embodiment can be utilized as a portable switching controller or as a simple portable night-light that can be used where no AC power is available, such as when camping. When used as a portable night-light, switches 840 can control the brightness of the electroluminescent sheet 724. For example, sheet 726 can be made to glow bright, medium, and low depending on the desires of the user.

The other components of the portable embodiment not specifically described are the same as the embodiment illustrated in FIGS. 23–26 and described herein above.

Figure 30:
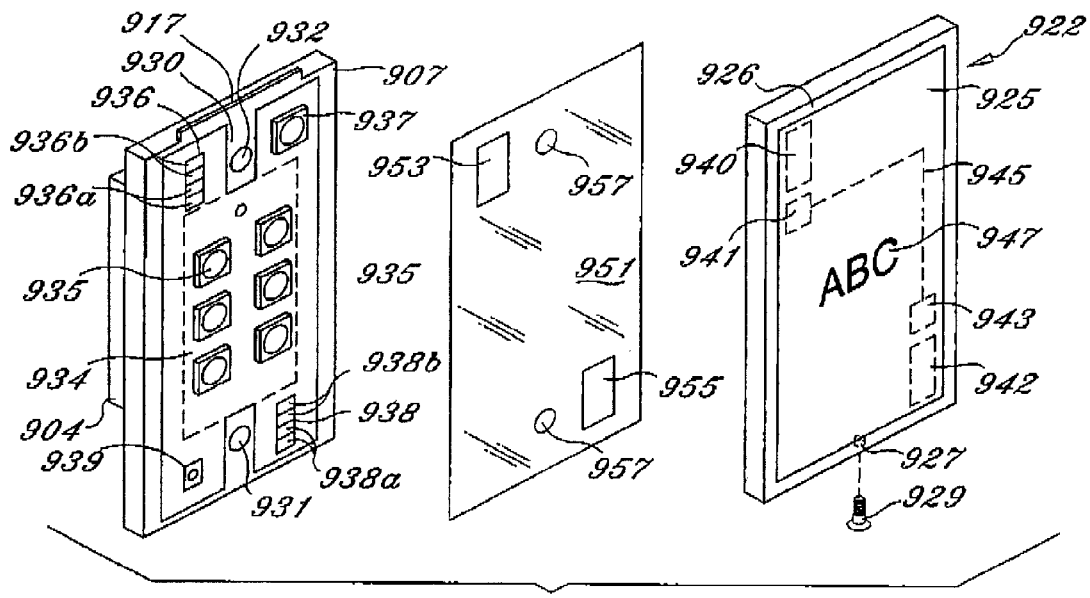
FIG. 30 is a front partially exploded perspective view of an alternative light switch assembly in accordance with the present invention
Figure 35:
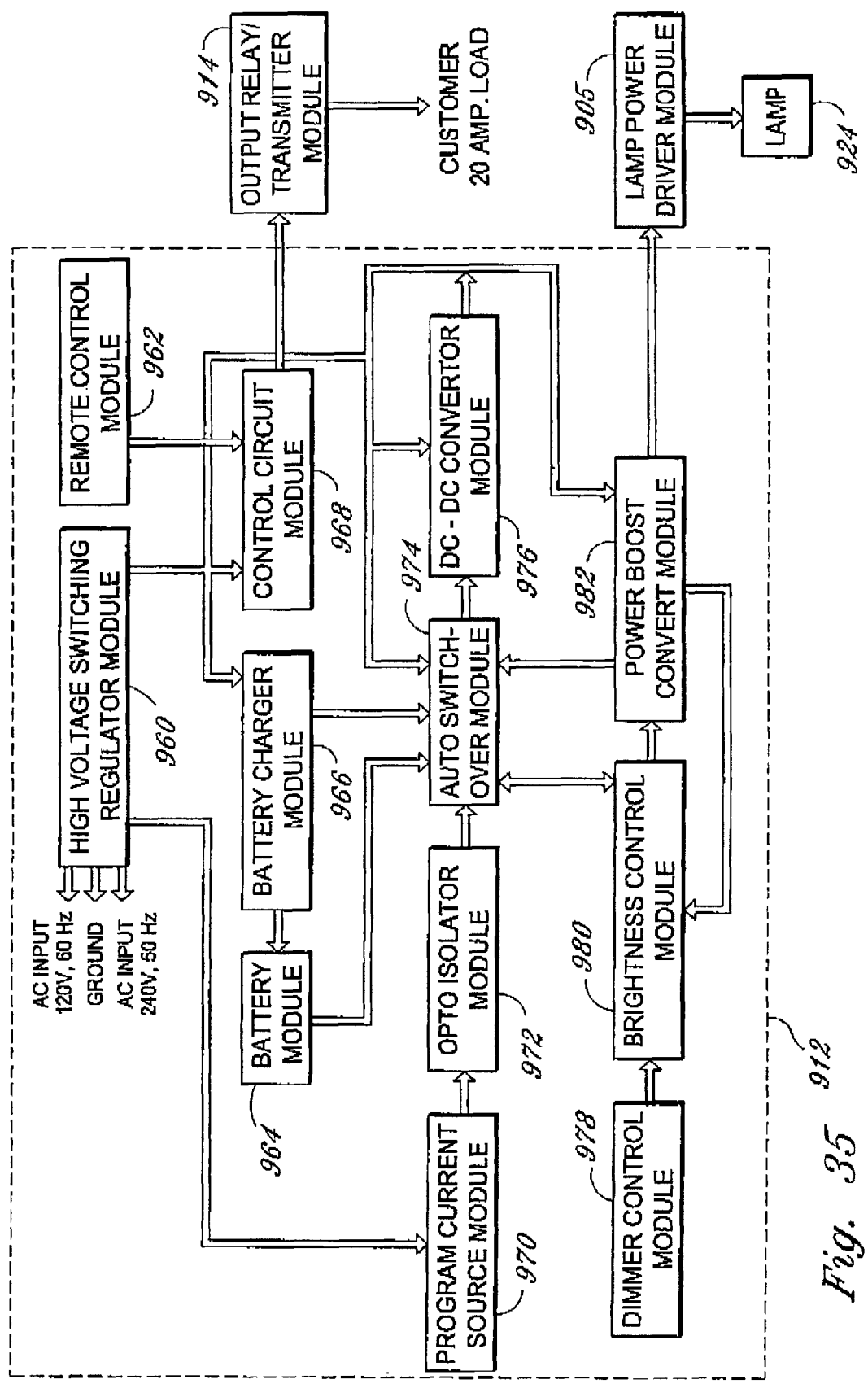
FIG. 35 is a block diagram of the electronics for the alternative light switch assembly of FIG. 30.

Referring to FIGS. 30 and 35, an alternate light switch assembly in accordance with the present invention is illustrated and includes an alternate location shown for the battery back-up circuitry which includes sensing circuit 900 and battery 902. Sensing circuit 900 can be the same circuit as described herein above as circuit 500 and circuit 600 for embodiments previously described, or an alternate inverter circuit as known in the art.

As illustrated in FIG. 30, an electrical box 904 is shown and can include a battery compartment for receiving and housing battery 902. Compartment 906 can be enclosed by cover 915. However, it should be understood that battery 902 can be disposed at other locations on electrical box 904, as well as at other positions of the invention (i.e. centered as in FIG. 32a), and that all locations are considered within the scope of the invention. Apertures 907, 908 and 909 in electrical box 904 are sized to receive wires as further described herein below.

Battery 902 can be a 9 volt battery or any other DC voltage battery such as 1.2V, 1.5V, 3V, 6V, 9V, 12V, and the like, and can be rechargeable with a built-in charging circuit such that periodic battery replacement is not required. Battery 902 can also be of a nickel-cadmium type or nickel-metal-Hydride type. However, it should be understood that any type, voltage and size battery can be used and is considered within the scope of the invention.

Figure 31:
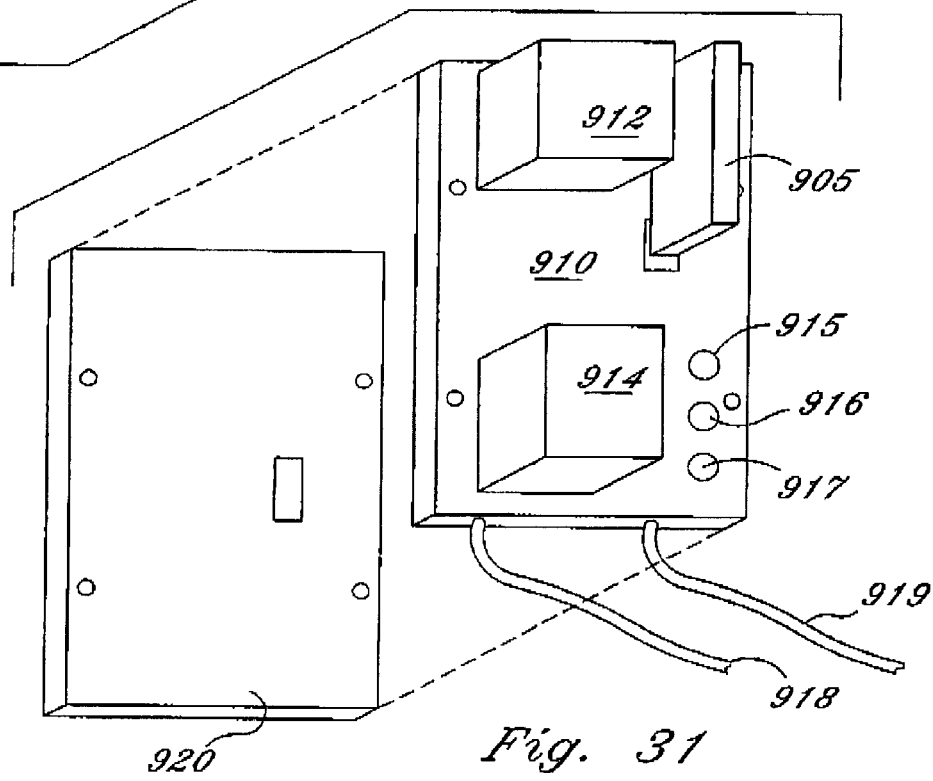
FIG. 31 is a back perspective view of a control circuit board and switch contact board for the alternative light switch assembly of FIG. 30.

Referring to FIG. 31, sensing or inverter circuit 905, can convert any selected DC voltage to AC output voltage, of preferably, though not limiting, greater than 24 volts at a preferred frequency range of approximately 50 to 5000 hertz, to power an electroluminesce light material, light bulb, illuminated removable or nonremovable cover plate, solid state lamp or other illumination, lighting or lamp devices, or other conventional audible or alarm type devices (collectively "lighting element"). Inverter circuit 905 can also provide steady or flashing illumination.

Inverter circuit 905 can be preferably mounted to a control printed circuit (PC) board 910. PC board 910 can include or have mounted thereto switching control circuitry 912, output control circuitry 914, terminals 915, 916 and 917, which can be battery terminals, and wires 918 and 919. Wires 918 and 919 can be replaced by terminal screws (not shown) for attachment of user wires. Upon assembly, wires 918 and 919 are inserted through two of apertures 907, 908 and 909 of box 904. A third wire (not shown) is provided where the invention is used with a configuration where two separate switches control one light (i.e. opposite ends of a hallway, where the hallway light is located approximately in the middle of the hallway, etc.) . Wires 918 and 919 are connected to house wiring for supplying typical house current as conventionally utilized for lights, lamps, television, and other in-home appliances, which can be 110–120 volts AC or 240 volts AC. However, the invention is not limited to these voltage values and other voltages can also be used and are considered within the scope of the invention.

A positive contact multi-switch or rubber switch PC board 920, can be connected to control circuit PC board 910, or alternately positive contact switches can be mounted directly to PC board 910. The switches can be any of the switch devices previously disclosed herein, and can include optional input devices such as timers, motion sensors, sound sensors, and the like. Additionally, the switches can also be activated by remote control, infrared, sound, phone, photocell, and/or computer interface.

The switches mounted to PC board 920, or alternatively directly on PC board 910, send command signals to switching and output control circuitry 912 and 914, to control the user's load, and the illumination of the lighting element. As previously described herein, the illumination of the lighting element can be activated whenever the light or other load is turned off, and the illumination can be deactivated whenever the light or other load is turned-on.

Switching and output control circuitry 912 and 914 can control standard user loads such as 15 or 20 amps, typically used for lamps, lights, TVs, and other home appliances. Higher loads of up to approximately 100 amps are also possible, and are considered within the scope of the invention. The output load capability is controlled by output control 914 which can include relay contacts for 2-way and 3-way instant or time delayed on/off control, solid state controls such as TRIAC (AC switch) , silicon controlled rectifier (SCR) for variable output devices such as a dimmer, or other solid state controls for custom applications.

Figure 32:
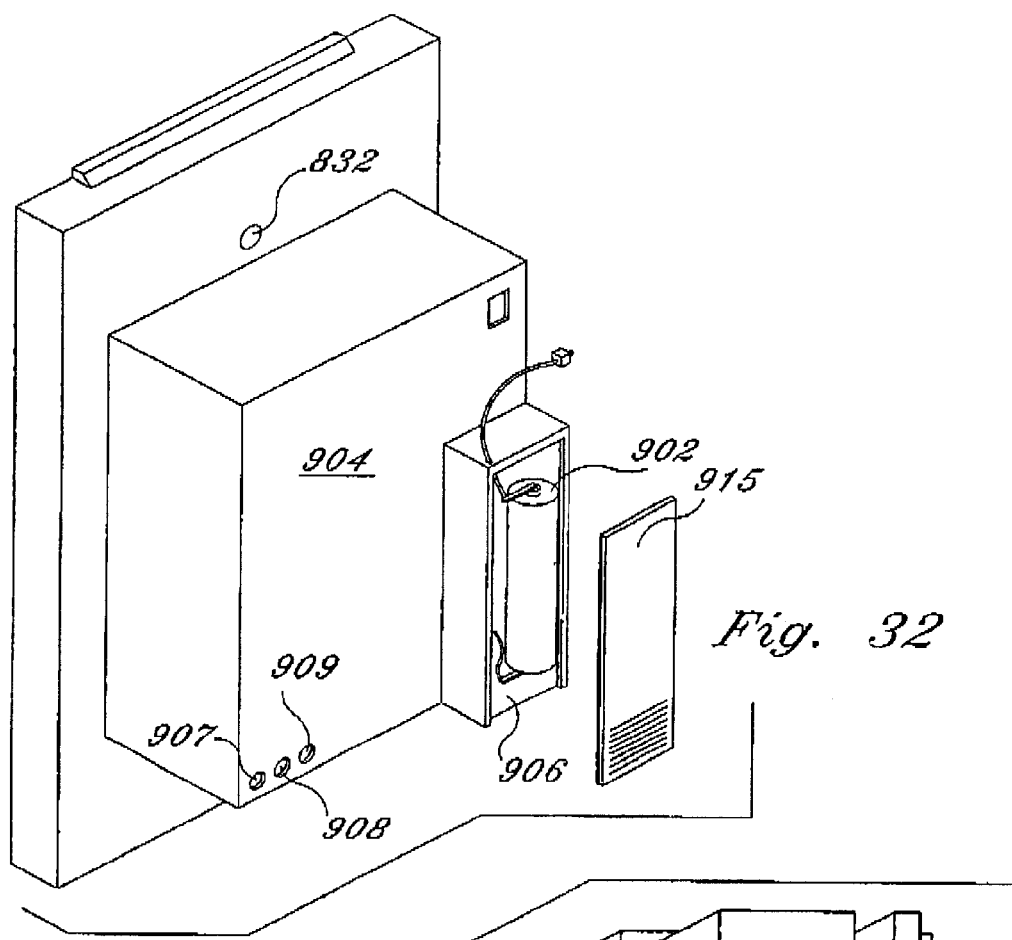
FIG. 32 is a back perspective view of an enclosure for the alternative light switch assembly of FIG. 30.
Figure 32A:
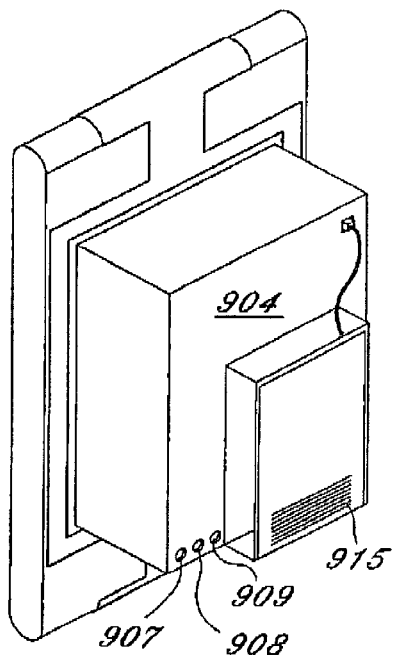
Figure 33:
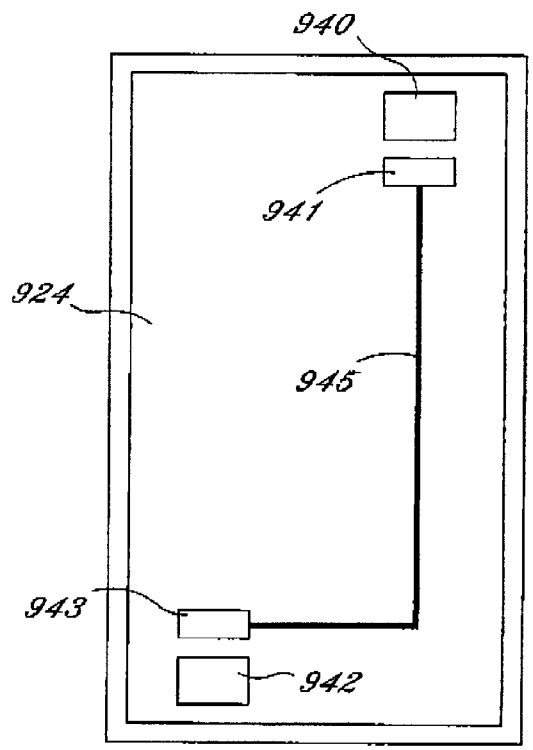
FIG. 33 is a front elevational view of an electroluminescense lighting sheet which can be used as the lamp for the alternative light switch assembly of FIG. 30.
Figure 34:
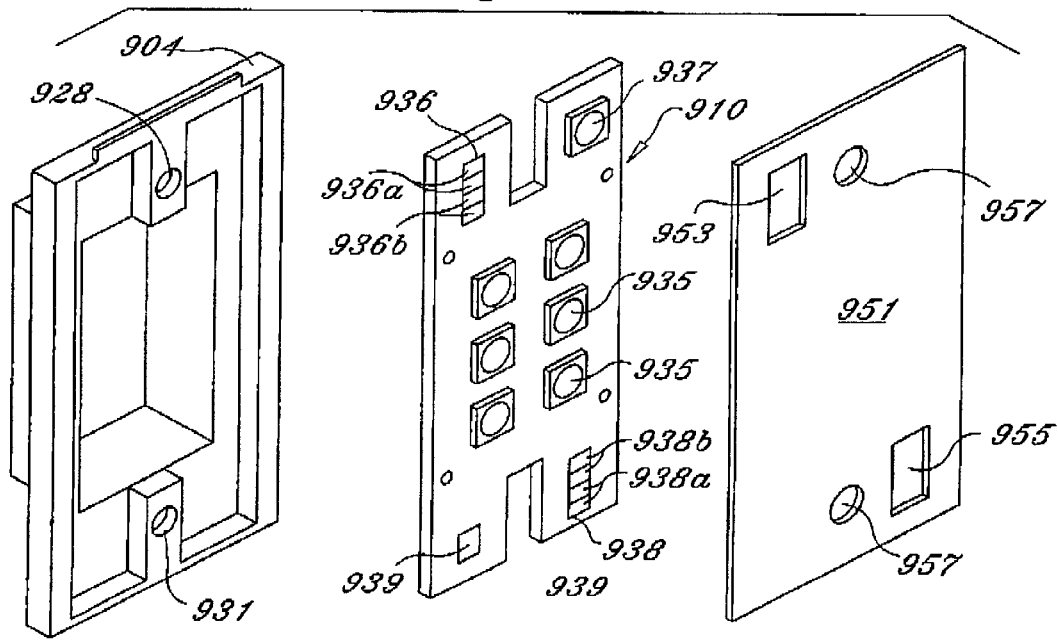
FIG. 34 is a front exploded perspective view of certain components of the alternative light switch assembly of FIG. 30.

Referring to FIGS. 32 and 33, one embodiment of cover assembly 922 includes a lighting element, such as electroluminescent light or lamp 924 which is preferably attached to a flexible decorative sheet 925 by conventional means such as adhesives. Sheet 925 itself can be decorative, or artwork, logos, initials, characters, or other indicia 947 can be imprinted thereon.

Light 924 and decorative sheet are held within a frame 926, which is preferably constructed from an at least substantially rigid material. Frame 926 can be any of the frames as described in the embodiments herein above and below, and can be made of a suitable plastic material, as well as other conventional materials, especially other substantially rigid materials. Frame 926 can be attached to the front of box 904 and held in place by set screw 929, or can be attached to a sub-frame assembly, which is discussed in detail below.

Mounting apertures 928 and 931 of box 904 are aligned with conventional apertures of a conventional wall box for receiving conventional screws (not shown) passing through apertures 928 and 931 and the wall box apertures, to properly attached or dispose box 904 with the conventional wall box.

Front multi-switch PC board 920, which alternately could be PC board 910, includes switch area 934 including a plurality of switches 935, a first plurality of spring-loaded contacts 936 and a second plurality of spring loaded contacts 938, dimmer switch 937 and automatic shut-off power switch 939.

An insulating, non-conductive sheet 951, such as a flexible mylar sheet, can be provided between the switches of board 910 or 920 and light 924. Sheet 951 provides additional safety for the present invention as it covers the switches and other circuitry, so not to expose such elements when cover assembly 922 is removed. Preferably sheet 951 has a good dielectric resistance and can be written upon to include graphics, logos, or other indicia on at least its outer exposed surface (i.e the word EXIT and an arrow pointing in the proper direction for the exit) . Sheet 951 is attached to the outer perimeter of box 904 and/or board 910 or 920 by conventional means, such as adhesive. Preferably cutouts 953 and 955 are provided which aligned with spring loaded contacts 936 and 938, respectively, to allow such contacts to extend through sheet 951 for mating with designated areas of lighting element 924. Apertures 957 can also be provided, which align with mounting apertures 928 and 931, and provide access to the mounting screws, which are used to attach box 904 to the conventional wall box.

First plurality of contacts 936 include an upper portion of contacts 936a and a lower portion of contacts 936b. Similarly, second plurality of contacts 938 include an upper portion of contacts 938b and a lower portion of contacts 936a. Contacts 936 and 938 preferably extend upward/outward of front PC board 910 or 920 and make contact with designated areas of light 924. When cover assembly 922 is properly attached, upper contacts 936a and lower contacts 936b extend through cutout 953 of insulating sheet 951 and make contact with socket pads 940 and 941, respectively, which are associated with light 924. Similarly, lower contacts 938a and upper contacts 938b extend through cutout 955 of insulating sheet 951 and make contact with socket pads 942 and 943, respectively, which are also associated with light 924.

Socket pads 940 and 942 are utilized in place of electrical wires, and function as power terminals for lamp 924. A jumper or bus bar 945 is in electrical communication pads 941 and 943 and together define a power feedthru and safety interlock for the invention. Conductive pads 940, 941, 942, and 943 and conductive jumper or bas bar 945 are preferably located on a back surface of lamp or lighting sheet 924. The circuitry of the invention is preferably designed such that, when cover assembly 922, with light 924, is not properly attached, an open circuit is seen between lower contacts 936b and upper contacts 938b, thus preventing power from being present at or supplied to upper contacts 936a and lower contacts 938a. Accordingly, a safety feature is provided at the contacts when assembly 922 is not attached.

When assembly 922 is properly attached, jumper bar 945, in conjunction with pads 941 and 943, create a short between lower contacts 936b and upper contacts 938b. This permits power to be present at upper contacts 936a and lower contacts 938a. As upper contacts 936a and lower contacts 938a are in contact with socket pads (power terminals) 940 and 942, respectively, light 924 can be energized under correct conditions (i.e. nighttime, etc.). Thus, the power feedthru and safety interlock feature senses when lamp 924 is properly connected. Preferably, pads 940, 941, 942 and 943 and jumper bar 945 are constructed from conductive ink, which is imprinted on the back side of lamp 924, though other alternatives could be used and are considered within the scope of the invention.

Automatic shut-off power switch 939 senses when the cover assembly 922 is properly attached to box 904. When cover assembly 922 is not properly attached, power and current flow is interrupted at the point where the wires come in from the house circuitry. Preferably, switch 939 can be a micro limit switch having a movable or pivotable spring loaded arm, though other devices or configurations can be used and are considered within the scope of the invention. When cover assembly 922 is properly attached, it pushes on the arm of the switch 939 to close the circuitry and allow current to flow to energize or power the lighting element, such as electroluminescent light or lamp 924. When cover assembly 922 is not properly attached, no pressure is applied to the arm of switch 939, thus, causing an open circuit at such point which interrupts current flow and prevents power from being supplied to light 924. Accordingly, switch 939 acts automatically by the attachment or removal of cover assembly 922, and provides a safety feature for the present invention when cover assembly 922 is removed.

Dimmer switch 937 controls the brightness of light 924 and preferably is provided with three levels of dimming (high, medium, low) and an "off" state. Other combinations of dimming and/or "off" states can be used and are considered within the scope of the invention. Dimmer switch 937 is preferably a tactile switch. Each time switch 937 is pressed, the next level of dimming or light control is activated. In the preferred embodiment, the levels of brightness for light 924 would have the following pattern upon successive depressions of switch 937: high, medium, low, off, high, medium, low, off, high, etc. However, other patterns could be used and are considered within the scope of the invention.

Where a power failure occurs from the house electrical system, the invention is preferably designed such that light 924 is at a maximum brightness, which preferably, is brighter in intensity than the "high" state of light 924 during normal operation (nighttime or other normal low level situations). Additionally, in this situation (power failure), the depression of switch 937 can be preferably designed not to have an effect on the brightness intensity of light 924, as the dimming circuitry associated with 937 is preferably bypassed. Light 924 can also be wired or programmed such that it provides no illumination during daylight or other high brightness times of day, even during a power failure.

The embodiment described above and in FIGS. 30–35 comprises an AC switching device for switching AC power to nearly any output load. Input control to the switching device can be via manual switches, motion, sound, remote control or other input mechanism.

In operation, the device or devices to be switched, which can include any of the devices described herein, is connected to output control 914. Switching control is then accomplished via one or more preselected switches connected to input switching control PC board 910. A separate multi-switch PC board 920, which can include a plurality of switches, can be mounted to PC board 910. The switches can include any of the switching devices discussed herein above.

For example, the output device may be a wall outlet connected to a lamp. The switch can be a manual switch, such as pressure sensitive push-button switch. Alternately, the output device could be an alarm, and the switch could be a motion sensor, or a audio sensor. Multiple output devices and switches can be used with each lighting element, such as an electroluminescent lighting sheet or lamp.

Batteries 902 can be preferably rechargeable NiCad batteries mounted to or housed at the rear of box 904. Other battery types can also be used and are considered within the scope of the invention. Box 904 includes a front mounting plate or bracket 907, preferably constructed integral therewith, which has screw socket or aperture on one end (preferably bottom end) and shoulder or lip 911 on the opposite end (preferably top end). Box 904 is mounted, within a wall box of a wall via conventional fasteners through apertures 928 and 931, or by other suitable manner.

In one embodiment, shoulder 911 fits into a recess of a frame (similar to recess 827 on frame 726. Alternatively, shoulder 911 can fit within a recess of a sub-frame, which is discussed in further detail below.

To assemble the embodiment where a frame similar to frame 726 is provided, lighting sheet 924 which is attached to a decorative sheet 925, preferably by adhesives, is placed within the cover frame, and the recess of the frame is set onto shoulder 911. Though not preferred, it should be understood and also considered within the scope of the invention for all embodiments, that decorative sheet 925 can be eliminated and any decorative element, if any, of the invention be provided on the outer exposed side of lighting sheet 924. The frame is then pressed against the front of plate 907 and set screw 925 is secured into socket or aperture preferably at the bottom end of box 904. Boards 910 and 920, or board 910 alone, having their circuitry, integrated chips, etc. are already attached to box 904. This attachment is effected by at least one, and preferably a plurality, of dowels 913 which protrude slightly outward of the front of box 904 and are receive through corresponding apertures(s) 921 on the PC boards. When properly positioned dowel(s) 913 extend or protrude slightly outward from their corresponding aperture(s) 921. To maintain the PC boards with respect to box 904, the protruding dowel portions are melts by conventional, such as a soldering iron. Insulating sheet 951 is then attached to box 904 and/or portions of boards 910 or 920, preferably by adhesives. Switches 935 and dimming switch 937 are all accessible through flexible electroluminescent sheet 924, decorative sheet 925 and insulating sheet 951. The assembly of the present invention incorporating a subframe will be discussed in detail below.

Though six switches 935 are illustrated, such is not limiting, and any number of switches 935, or other types of switches, from one to six or more, can be used and are considered within the scope of the invention. Switches 935 are used to switch any preselected load as described herein above. Switches 935 could be replaced with nearly any type of switching device including motion sensors, photosensors, audio sensors, and the like.

FIG. 35 illustrates a block diagram for the embodiment disclosed in FIGS. 30 through 34. A High Voltage Switching Regulator Module 960 is preferably provided in the form of an Integrated Chip and can convert any AC power input to low voltage DC power for powering all modules shown in FIG. 35, except Battery Module 964. An optional Remote Control Module 962 can be provided to communicate with Control Circuit Module 968 to turn "off" and "on" the load controlled be Output Relay/Transistor Module 914 and/or the dimming control for lamp 924. Remote Module 962 can be operated by a hand held remote having a preferred range of 0 to 40 k Hertz. Remote Module 962 receives and senses infra-red signals from a hand held remote (not shown) and communicates with the signals with Control Circuit Module 968. The Remote Module can complement and/or replace switches 935.

Battery Module 964 consists of the battery(ies) used to power the backup system in the event of a power failure. Module 964 is not limited to any one type or size of battery, and many different conventional battery types and sizes can be used and all are considered within the scope of the invention.

A Battery Charger Module 966 can be provided for placing a relatively very small current through the battery of Battery Module 964 at a constant rate to charge the battery. Regardless of size, Battery Module 966 can charge a plurality of batteries (cells) at one time, and preferably can charge at least sixteen batteries at once. Battery Charger 966 can consist of conventional circuitry that looks at the voltage and temperature of the batteries to recharge to ensure that they don't overheat. Battery Charger Module 966 can be designed to have two different charging levels. If the battery voltage is low, Charger Module 966 goes into a "fast" charge mode. Once the voltage reaches or is at a predetermined voltage, Charger Module 966 automatically switches to a "trickle" charge mode.

A Control Circuit Module 968 senses input from switches 935 on the control panel or input from the Remote Control Module 962, to turn "on" or "off" the relays associated with Output Relay/Transistor Module 914 or otherwise control Module 914. Module 914 consist of the output control circuitry 914 discussed above, which is connected to the output load (lamp, light, outlet, ceiling fan, etc.)

A Programmable Current Source Module 970 in conjunction with OptoIsolator Module 972 and Auto Switch Over Module 974 inform the system when a power failure from a direct line has occurred. Programmable Module 970 takes high voltage input from the direct line and converts to a current, preferably between zero (0) to twenty (20 mA) milli-Amps, to determine if there has been a power loss. The current is fed or otherwise supplied to OptoIsolator Module 972 where it is converted into light. Optoisolator Module 972 then converts the light into voltage. Modules 970 and 972 clean up spikes in the current from power surges, and other occurrences, which could cause the current to exceed twenty (20 mA) milli-Amps. Modules 970 and 972 also act as a filter to pass through a maximum current of 20 mA. Thus, OptoIsolator Module 972 isolates the input from the output.

Auto Switchover Module 974 looks for voltage at Optoisolator Module 972. If voltage is present, Module 974 knows that there is power to the system. If no voltage is present, Module 974 assumes that a power loss or failure has occurred and looks to Battery Module 964 (battery backup system) for power for the system. DC-DC Convert Module 976 takes the DC voltage from the battery and boost or otherwise increases the DC voltage up to approximately 12 Volts. Where two 1.2 Volts No-Cad batteries are used, Module 976 converts the 2.4 Volts DC to preferably 12 Volts DC. Conventional circuitry such as two capacitors (charging and discharging) can be use to increase the DC voltage.

The 12 Volts DC from Module 976 is fed into Power Boost Convert Module 982 to convert the 12 Volts-DC into approximately 110 Volts-AC. In one embodiment, Module 976 can consist of two MOSFET transistors in a push-pull relationship which are switched back and forth by an oscillator. However, other conventional circuitry can be used and is considered within the scope of the invention. The converted 110 Volts-AC is preferably in a square wave output.

Dimmer Control Module 978 preferably consist of switch 937, which along with switches 935, are preferably momentary pushbutton tactile switches. Other conventional switches, such as slide or rocker switches, though not preferred, can be used and are also considered within the scope of the invention. Module 978, by switch 937, sends or otherwise provides an input signal to Brightness Control Module 980. Different levels of brightness are accessible through the depression of switch 937 a specific amount of times.

Brightness Control Module 980 monitors the input pulse or signal from Dimmer Control Module 978 to determine the level of brightness for lamp 924. In one embodiment Module 980 consist of three different zener diodes, which clamp at different voltages. The first diode can be designed to clamp from approximately 82V–110V AC (110V AC being the maximum volts passing through module 980). Though 82V AC is selected, such value should not be considered limiting, and other values can be selected and are also considered within the scope of the invention. The preferred 82V cutoff corresponds to the "high" setting for lamp 924, which is set by the pressing switch 937 of Module 978 a specific amount of times.

The second diode can be designed to clamp from approximately 62V–110V AC). Though 62V AC is selected, such value should not be considered limiting, and other values can be selected and are also considered within the scope of the invention. The preferred 62V cutoff corresponds to the "medium" setting for lamp 924, which is set by the pressing switch 937 of Module 978 a specific amount of times.

The third diode can be designed to clamp from approximately 52V–110V AC). Though 52V AC is selected, such value should not be considered limiting, and other values can be selected and are also considered within the scope of the invention. The preferred 52V cutoff corresponds to the "low" setting for lamp 924, which is set by the pressing switch 937 of Module 978 a specific amount of times.

Thus, in the preferred embodiment, Module 980 senses switch input from Dimmer Control Module 978, and controls three levels of brightness for lamp 924, as well as an "off" mode for lamp 924. Other levels, such as med-low or med-high, can be incorporated into design of module 980 be adding additional zener diodes having specific cutoff values which differ from the diodes discussed above. It will also be recognized that other conventional circuitry can be used to achieve the functions of Module 980 and such other circuitry is also within the scope of the invention.

Where switch 937 is depressed to place Module 980 in an "off" mode, an open circuit is created, disabling the 110V-AC and causing Power Boost Convert Module 982 not to work, until switch 937 is depressed to place Module 980 in a mode other than its "off" mode, i.e. "high", "medium", "low", etc.

Lamp Power Drive Module or Power Invertor 905, discussed in detail above, energizes lamp 924 and regulates the 110V-AC at preferably 450 Hertz, so that lamp 924 runs at extremely low current and practically eliminates any heat. As the resistance of lamp 924 can change over time, Module 905 can be designed to match the frequency to the resistance characteristics and specifications of lamp 924, and allows for retuning of itself where resistance or impedance characteristics or specification for lamp 924 change.

Unless specifically discussed, conventional technology, and circuitry can be used for the various modules discussed in FIG. 35. When viewed in conjunction with FIG. 31, in the preferred embodiment, Lamp Power Driver Module or Power Inverter 905 is seen as a first Integrated Chip. Modules 960, 962, 966, 968, 970, 972, 974, 976, 978, 980 and 982 are all preferably contained within Switching Control Circuitry Integrated Chip 912. Output Module or Output Circuitry 914 is seen as an Integrated Chip. Chips 905, 912, and 914 are all preferably connected to and in communication with PC Board 910.

Similar to FIGS. 27 through 29, a portable version of the embodiment illustrated in FIGS. 30 through 35 can be provided and is considered within the scope of the invention.

Figure 30A:
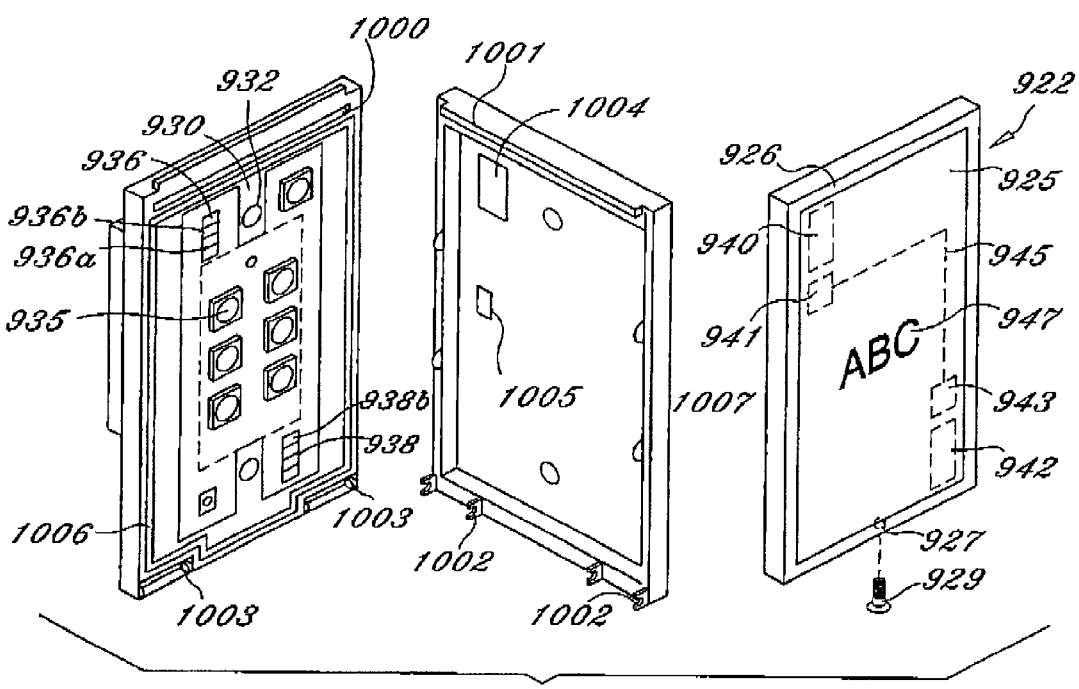
Figure 36:
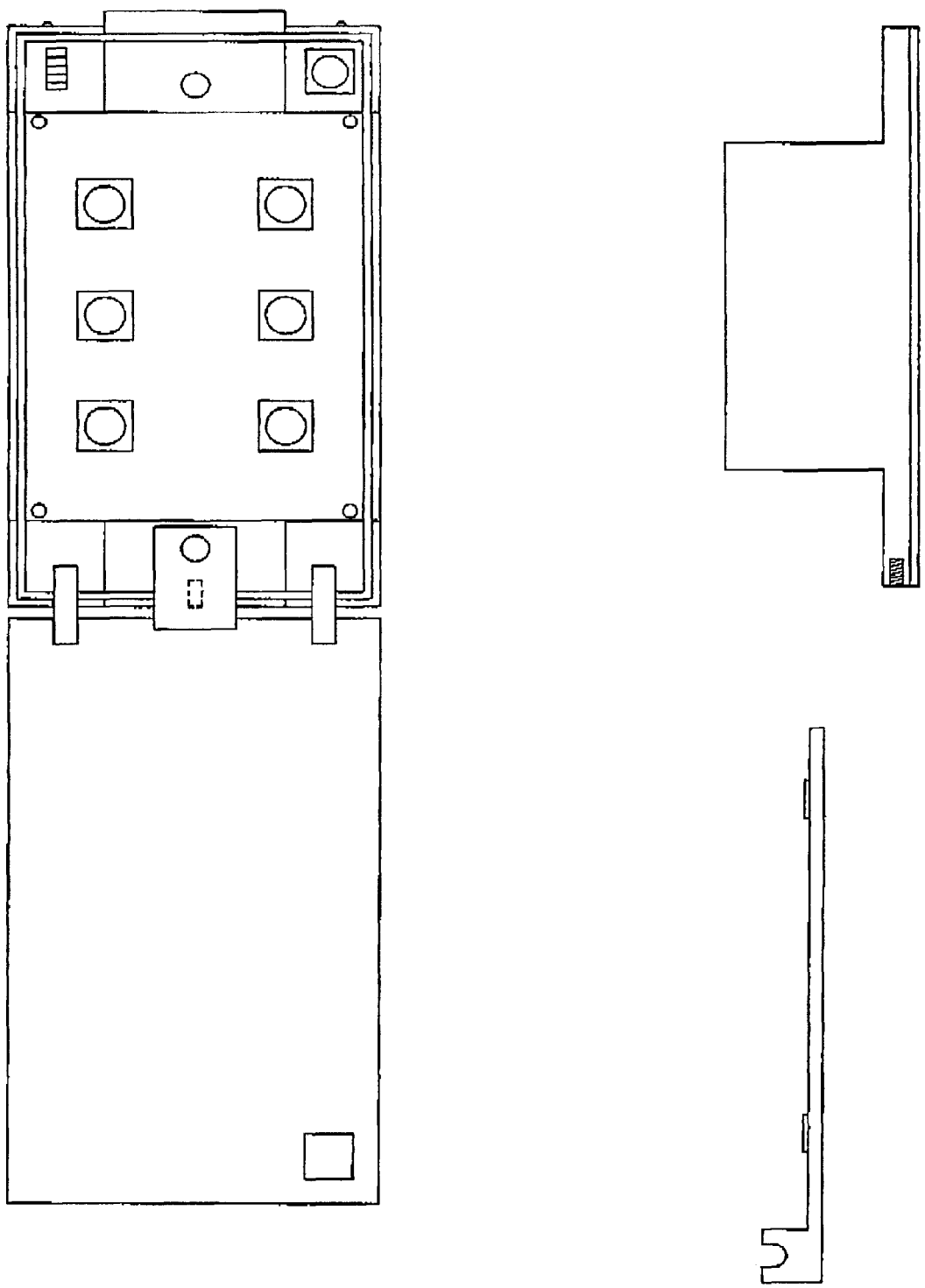
FIG. 36 is several views of a further alternative light switch assembly.

FIGS. 30a and 30b, consists of alternative designs, with similar components shown in the drawings, to earlier embodiments discussed above. FIG. 36 also illustrates an alternative embodiment for the present invention light switch assembly.

Figure 37:
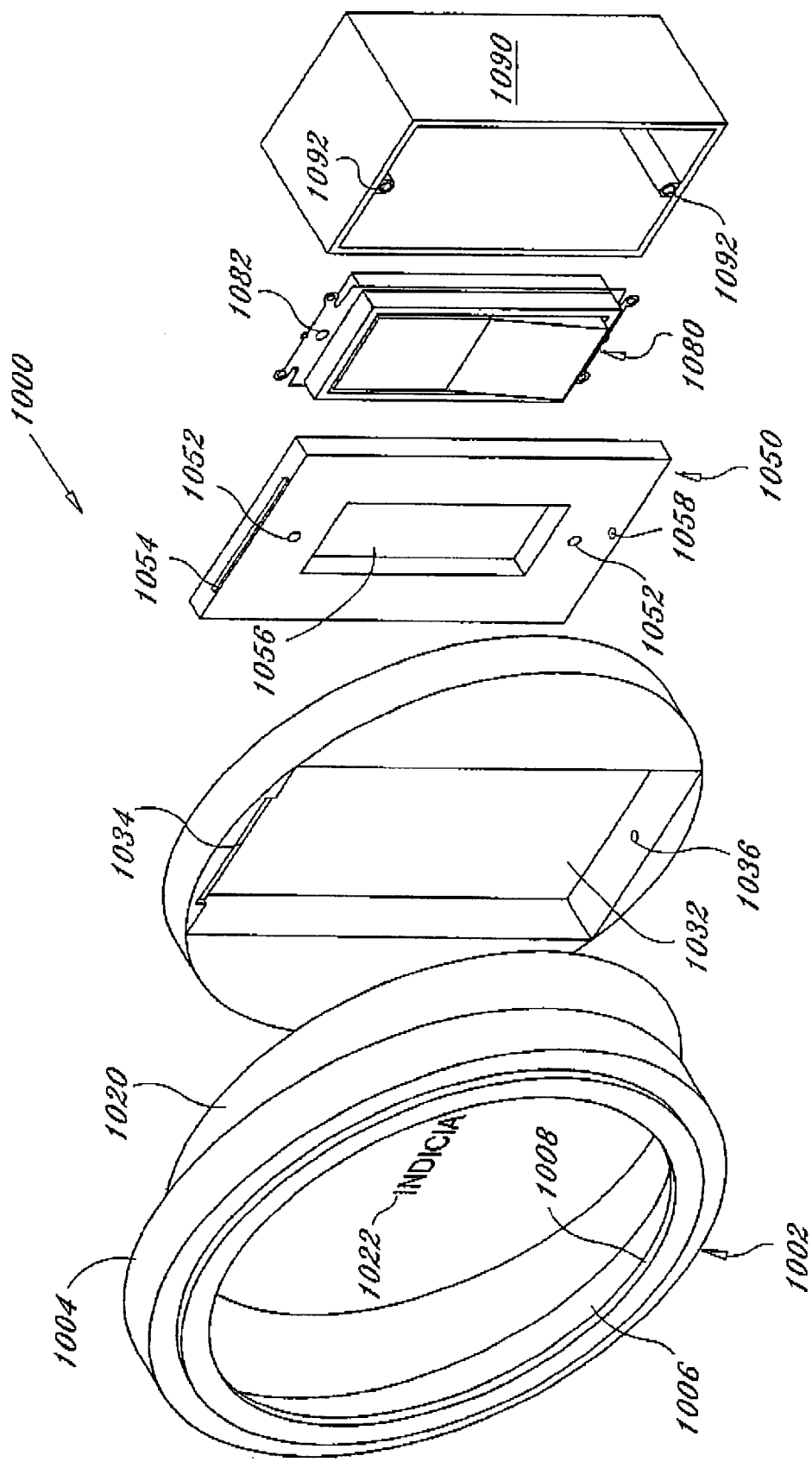
FIG. 37 is an exploded perspective view of a cover assembly including inner and outer frames in accordance with the present invention.

As seen in FIG. 37 a first attachment embodiment for a light switch cover 1000, incorporating an inner or sub frame, is illustrated. Cover 1000 includes an outer frame 1002, a flexible decorative sheet 1020, an inner frame 1030 and a mounting bracket 1050. Cover 1000 completely covers a conventional switch 1080 which is attached to and partially disposed within a conventional wall box 1090. Switch 1080 can be a rocker switch, tactile switch, toggle switch, slide switch or any other conventional switch, all being considered within the scope of the invention. Switch 1080 includes an operating lever 1083. Where a toggle or slide switch is provided, appropriate apertures in decorative sheet 1020 may be necessary to properly access such switches. However, similar to earlier discussed embodiments of the invention using a rocker or tactile switch, though switch 1080 is completely covered by cover 1000, switch 1080 is still operable without having to remove cover 1000.

Cover 1000 allows for use of any shape outer frame 1002 with a standard shaped mounting bracket 1050 and switch 1080. Outer frame 1002 includes an a sidewall 1004, which is shown in FIG. 37 as circular, though such is not limiting. Sidewall 1004 defines an aperture 1006 to allow decorative sheet 1020 to be viewed and switch 1080 to be operated. Outer frame 1002 can be constructed from numerous conventional materials, and is preferably constructed from an at least substantially rigid material such as plastic, polycarbonate, wood, marble, etc.

Decorative sheet 1020 is constructed from any conventional flexible material to allow switch 1080 to be operated, which is disposed behind sheet 1020 when cover 1000 is attached. At least an outer surface of decorative sheet 1020 can be a decorative design itself and/or include decorative symbols, indicia, letter(s), number(s), figure(s), logo(s), artwork, pattern(s), word(s), picture(s), etc. (collectively referred to as "decorative design 122") can be provided on at least the outer surface of decorative sheet 1020. Additionally, decorative design 122 of decorative sheet 1020 can be matched to a design incorporated into outer frame 1002 or some other item (i.e. countertop, cabinet, wallpaper) or portion of a room where cover 1000 is attached. Though not preferred, it is also within the scope of the invention, that a portion of decorative sheet 1020, that will not be pushed, pressed or otherwise touched by the user to operate switch 1080, can be constructed from a conventional non-flexible material.

Mounting bracket 1050 is attached to wall box 1090 by apertures 1052 and conventional screws (not shown). To attach mounting bracket 1050, apertures 1052 are aligned with apertures 1082 of switch 1080 and apertures 1092 of box 1090 and the screws are inserted through such apertures by conventional means. Preferably, apertures 1052, 1082 and 1092 and the attachment screws are threaded. Thus, the attachment of mounting bracket 1050 to wall box 1090 also attached switch 1080 to box 1090. The mounting bracket can also be similar to any of the mounting brackets discussed above and below, and all are considered within the scope of the invention.

Inner frame 1030 includes an aperture 1032 which is shaped similar, if not identical, to the outer perimeter shape of mounting bracket 1050 (rectangular as shown, though such shape is not considered limiting). The size of aperture 1032 is slightly larger than the outer perimeter of mounting bracket 1050 for receipt thereof. An elongated upper groove 1035 terminating at an end wall 1037 can be provided at the top of aperture 1032 and is in communication therewith. A flange 1054 which can be disposed at the top of mounting bracket 1050, and is preferably integral therewith, is received within groove 1035 and abuts end wall 1037 when positioning mounting bracket 1050 within aperture 1032.

To maintain mounting bracket 1050 within aperture 1032, inner frame 1030 is attached to mounting bracket by preferably inserting a conventional screw (not shown) within aperture 1036 of inner frame 1030 and cavity 1058 of mounting bracket 1050, which are aligned with each other for proper attachment. Preferably, aperture 1036, cavity 1058 and their associated attachment screw are threaded, though such is not considered limiting. Inner frame 1030 and/or mounting bracket 150 can be constructed from numerous conventional materials, and are preferably constructed from an at least substantially rigid material such as plastic, polycarbonate, wood, marble, etc.

The outer perimeter shape of inner frame 1030 is preferably chosen to match the shape of an aperture 1006 of outer frame 1002. The shape of aperture 1006 preferably is similar or matches the outer perimeter shape of outer frame 1002, though such is not considered limiting. Aperture 1006 includes a side wall 1004 and can be provided with a lip 1008. The diameter (where circular) or outer perimeter (non-circular) of aperture 1006 is slightly larger than the corresponding outer diameter or outer perimeter of inner frame 1030. Thus, when attaching outer frame 1002 to inner frame 1030, inner frame 1030 is received within aperture 1006, and preferably snugly received. Prior to positioning inner frame 1030 within aperture 1006, decorative sheet 1020 is positioned within aperture 1006.

When properly attached, at least a portion of a first surface of decorative sheet 1020 abuts lip 1008 and at least a portion of a second surface of decorative sheet abuts inner frame 1030. The operable portion of switch 1080 protrudes through aperture 1056 of mounting bracket 1050 and is preferably positioned within aperture 1032 of inner frame, along with mounting bracket 1050. Additionally, the operable portion of switch 1080 abuts decorative sheet 1020 or is maintain relatively and operatively close to decorative sheet 1020. Thus, a user can operate the completely covered switch 1080 by pressing on the appropriate adjacent portion of decorative sheet 1020 without having to remove outer frame 1002 to expose switch 1080.

Figure 38:
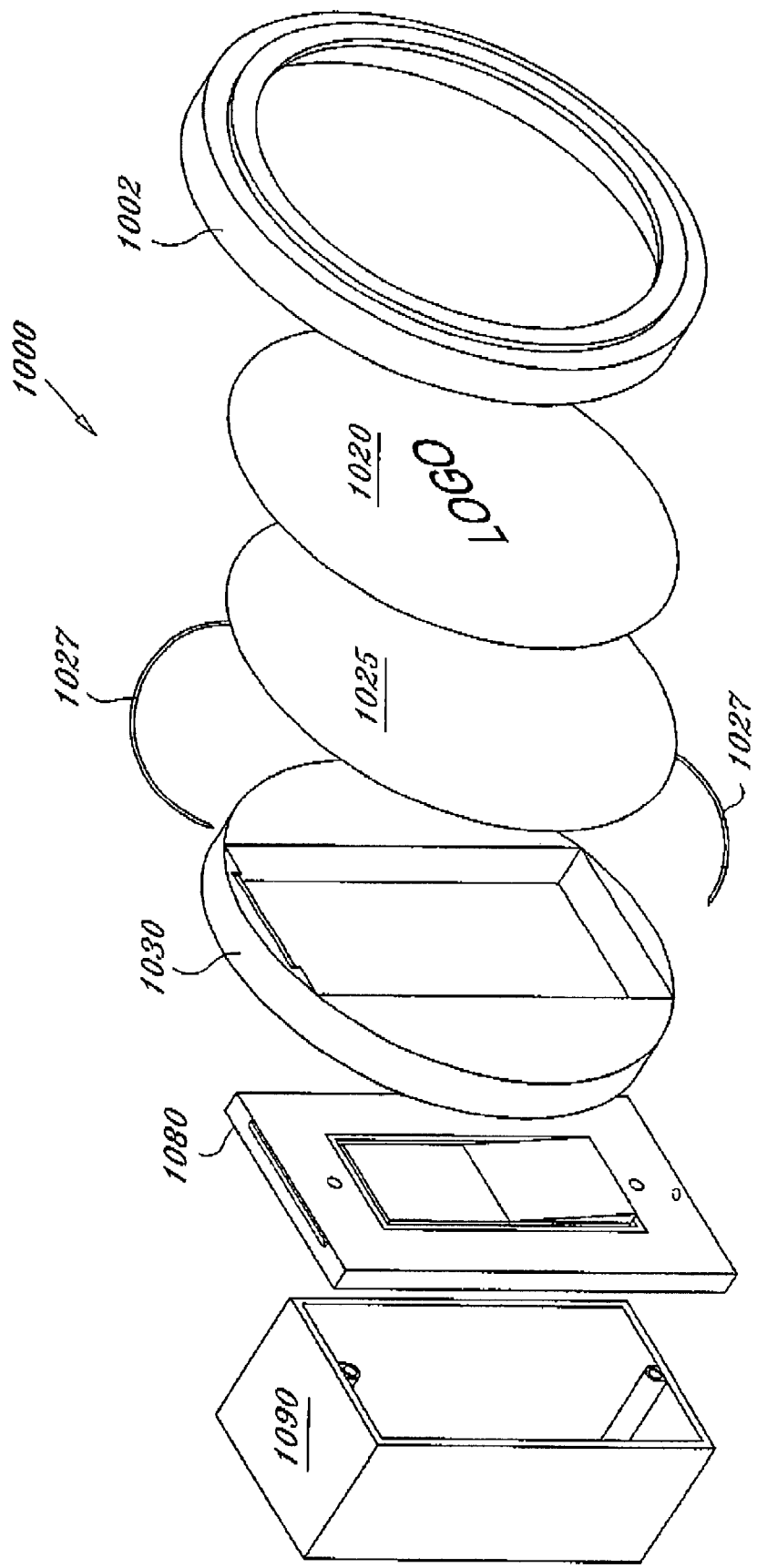
FIG. 38 is another exploded perspective view of the cover assembly invention of FIG. 37.

FIG. 38 illustrates cover assembly 1000 of FIG. 37 with the addition of a lighting sheet 1025, such as an electroluminescent light or lamp. Lighting sheet 1025 can be attached to decorative sheet by conventional means, such as adhesives. As discussed above, in earlier embodiments of the invention, wires 1027 are attached at one end to lighting sheet 1025 and at second end to the circuitry of switch 1080. Alternatively, the contacts and socket pads, with or without safety features, discussed above, can be incorporated into the lighting sheet and switch assembly, and is also considered within the scope of the invention.

Referring to both FIGS. 37 and 38, by providing an inner frame, such as inner frame 1030, having an aperture shaped according to the shape of the perimeter of a mounting bracket, such as mounting bracket 1050, and by having the outer perimeter of the inner frame shaped according to the shape of an aperture of an outer frame, such as outer frame 1002, the user can interchange and/or use different shaped outer frames with a single standard shaped mounting bracket, i.e. rectangular. Thus, to change to a different outer frame style, the user removes and replaces the outer and inner frames, but the mounting bracket and associated switch remain in place.

Inner frame 1030, along with decorative sheet 1020 (FIG. 37) or decorative sheet 1020 and lighting sheet 1025 (FIG. 38), can be permanently attached to outer frame 1002 by conventional means, such as welding, ultrasonic welding, bonding techniques, adhesives, etc. Alternatively, inner frame 1030, decorative sheet 1020 and outer frame 1002, as well as lighting sheet 1025 where provided, can be removably attached to each other also by conventional means.

Figure 39:
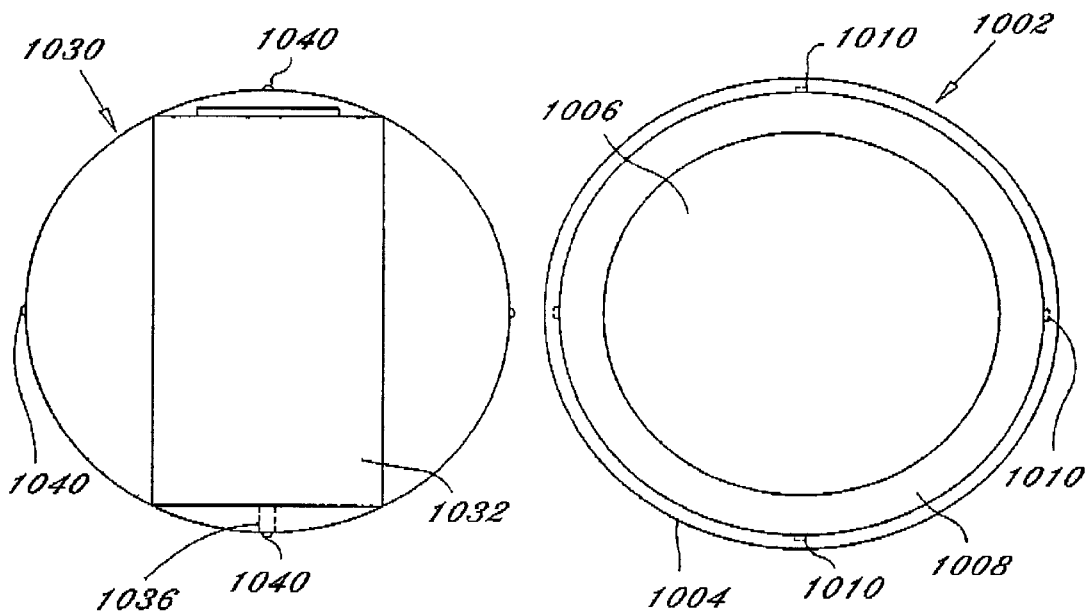
FIG. 39 are front elevational views of certain components of the cover assembly invention of FIG. 37.

One removable attachment embodiment is illustrated in FIG. 39, wherein at least one protrusion 1040, and preferably a plurality of protrusions 1040, are disposed on the outer perimeter of inner frame 1030 a selected distances from each other, preferably evenly. A corresponding number of cavity(ies) 1010 are provided within the inner surface of side wall 1004 of outer frame 1002. Cavities 1010 are spaced from each other similar to the spacing of protrusions 1040. Once decorative sheet 1020 (FIG. 37) o decorative sheet 1020 and lighting sheet 1025 (FIG. 38) is/are disposed within aperture 1006, inner frame 1030 is disposed within aperture 1006, such that protrusions 1040 are received and disposed within their corresponding cavities 1010, to provide a releasable or removable attachment of outer frame 1002 to inner frame 1030. Where it is desirable to remove outer frame 1002 from its attachment to inner frame 1030, a sufficient force or pressure applied by the user is sufficient to force protrusions 1040 out of cavities 1010 thus allowing outer frame 1002 to be removed.

Though four (4) protrusions 1040 and corresponding cavities 1010 are illustrated, such number is not considered limiting and other numbers of protrusions and cavities, less and greater than four, as well as other shapes and sizes for the protrusions and cavities, can be used and are considered within the scope of the invention. It is also within the scope of the invention that more cavities are provided than protrusions. Furthermore, the location of the protrusions and cavities can be interchanged (i.e. protrusions associated with side wall 1004 and cavities located on inner frame 1030).

It should also be recognized that the specific structure for attaching inner frame 1030 to mounting bracket 1050 and for attaching outer frame 1002 to mounting bracket 1050 is not critical and other conventional attachment structure can be incorporated into the cover assembly and are considered within the scope of the invention.

Figure 40:
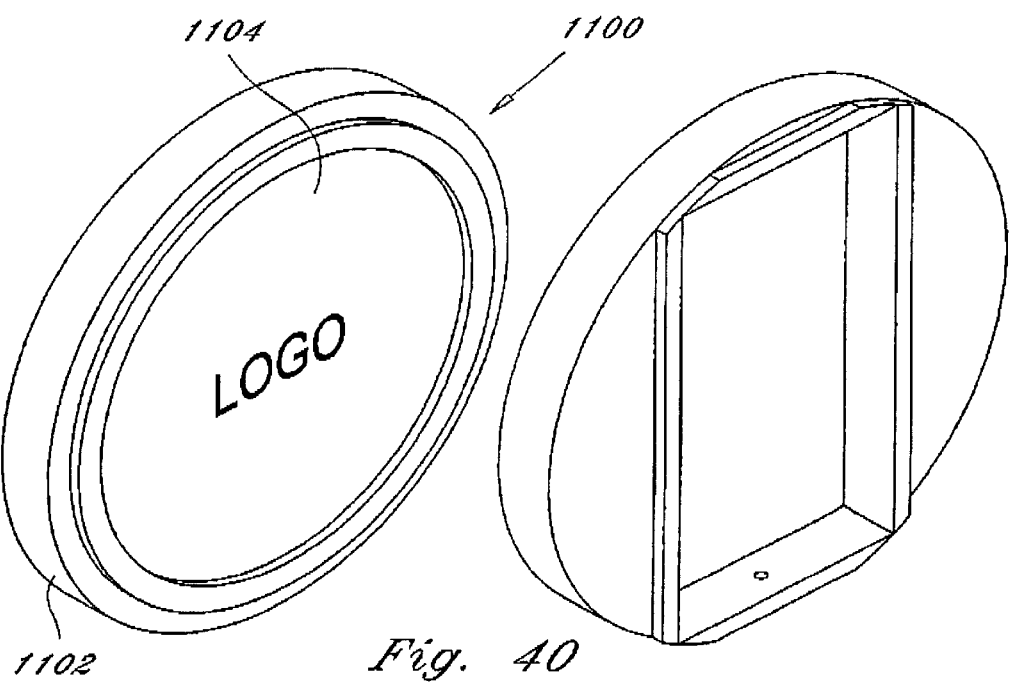
FIG. 40 are perspective view of certain components of the cover assembly invention of FIG. 37.

FIG. 40 illustrates an outer frame 1100 which is constructed integral with the decorative aspects. Thus, no separate decorative sheet is provided, nor is outer frame 1100 provide with an aperture. Rather a cavity, shaped similar to aperture 1006 of outer frame 1002, is defined by side wall 1102 and front surface 1104 of outer frame 1100. The decorative designs are preferably disposed on front surface 1104, though other locations on outer frame 1100, alone or in combination with front surface 1104, can also be provided and are also within the scope of the invention. Outer frame 1100 is attached to an inner frame, such as inner frame 1030 of FIGS. 37, 38 and/or 39. However, no decorative sheet is disposed within the cavity of outer frame 1100 prior to its attachment to an inner frame. Besides the elimination of a decorative sheet 1020, all of other above-discussion above for outer frame 1002 and inner frame 1030, are also applicable to outer frame 1100. The entire outer frame 1100 can be constructed from a flexible material. Alternatively, only a switch adjacent portion of outer frame 1100 can be constructed from a flexible material, with the remaining portion being at least somewhat rigid. Other flexible/rigid combinations can be used and are also considered within the scope of the invention. Furthermore, the lighting sheet can be attached to at least a portion of the decorative portion of cover frame 1100 as described above.

Figure 42:
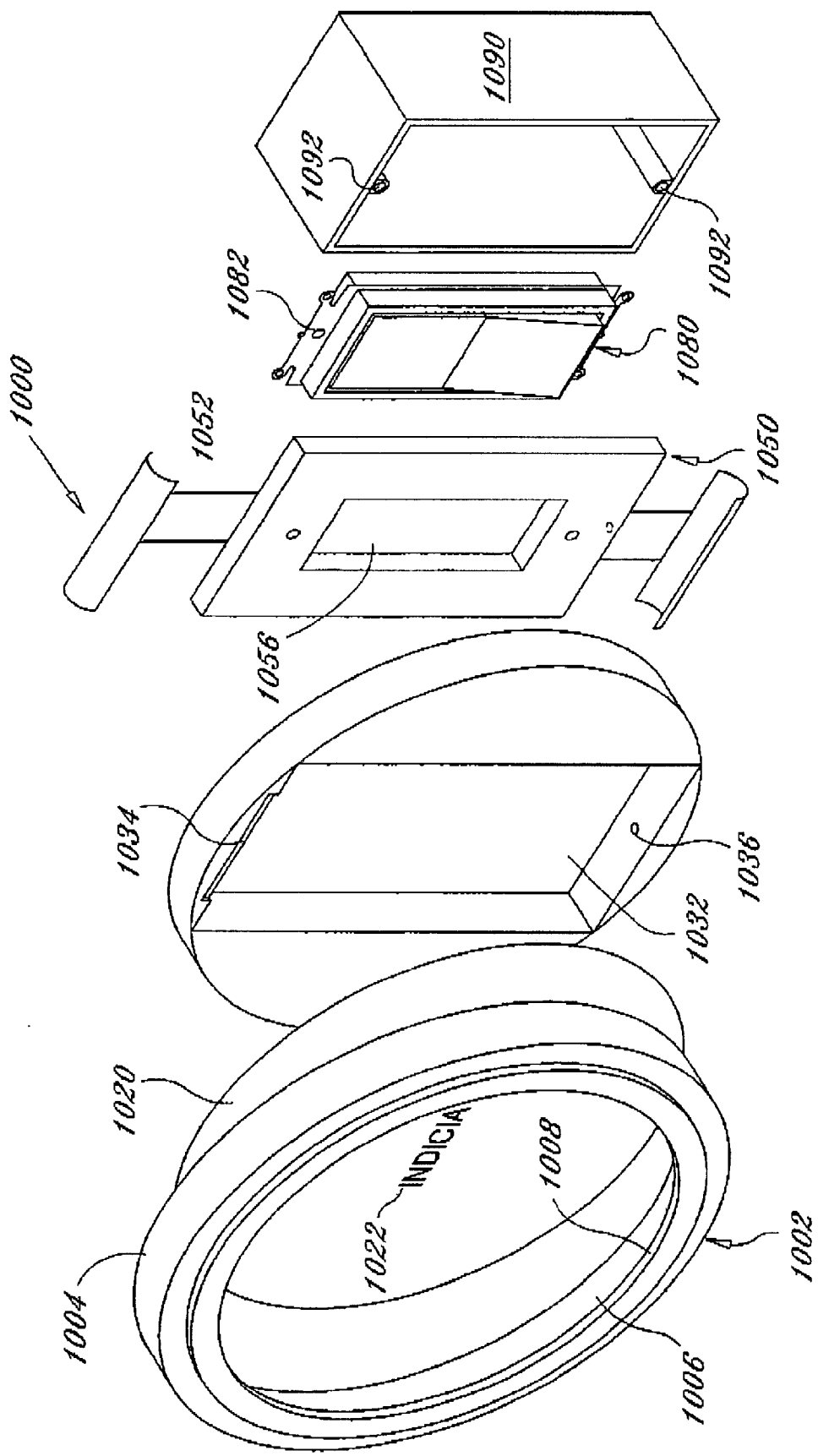

FIGS. 41 and 42 illustrate an alternative embodiment for the sub-frame assembly, including flexible protrusions 1200 on the mounting bracket, and also incorporates a weatherproof gasket. FIG. 43 illustrates use of a sub-frame assembly with one of the light switch assemblies of the present invention. It should be understood that the various sub-frame assemblies can each be incorporated into any of the light switch assembly embodiments or light switch cover embodiments of the present invention, and all are considered within the scope of the invention.

Figure 44:
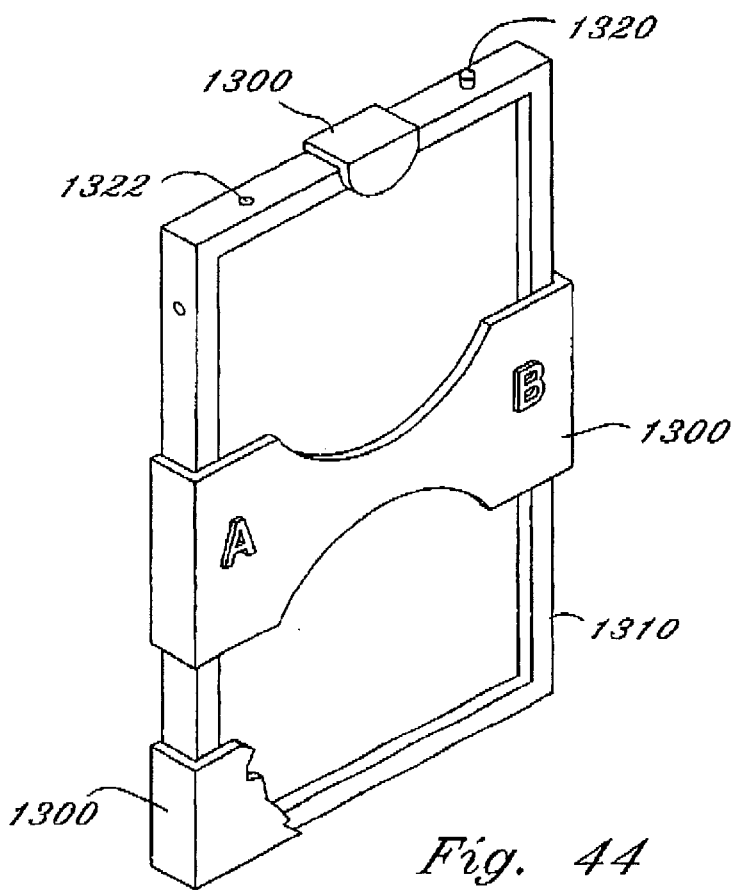
FIGS. 44 and 45 illustrated decorative elements that can be attached to the outer frame in accordance with the present invention.
Figure 45A:
Figure 45B:
Figure 48:
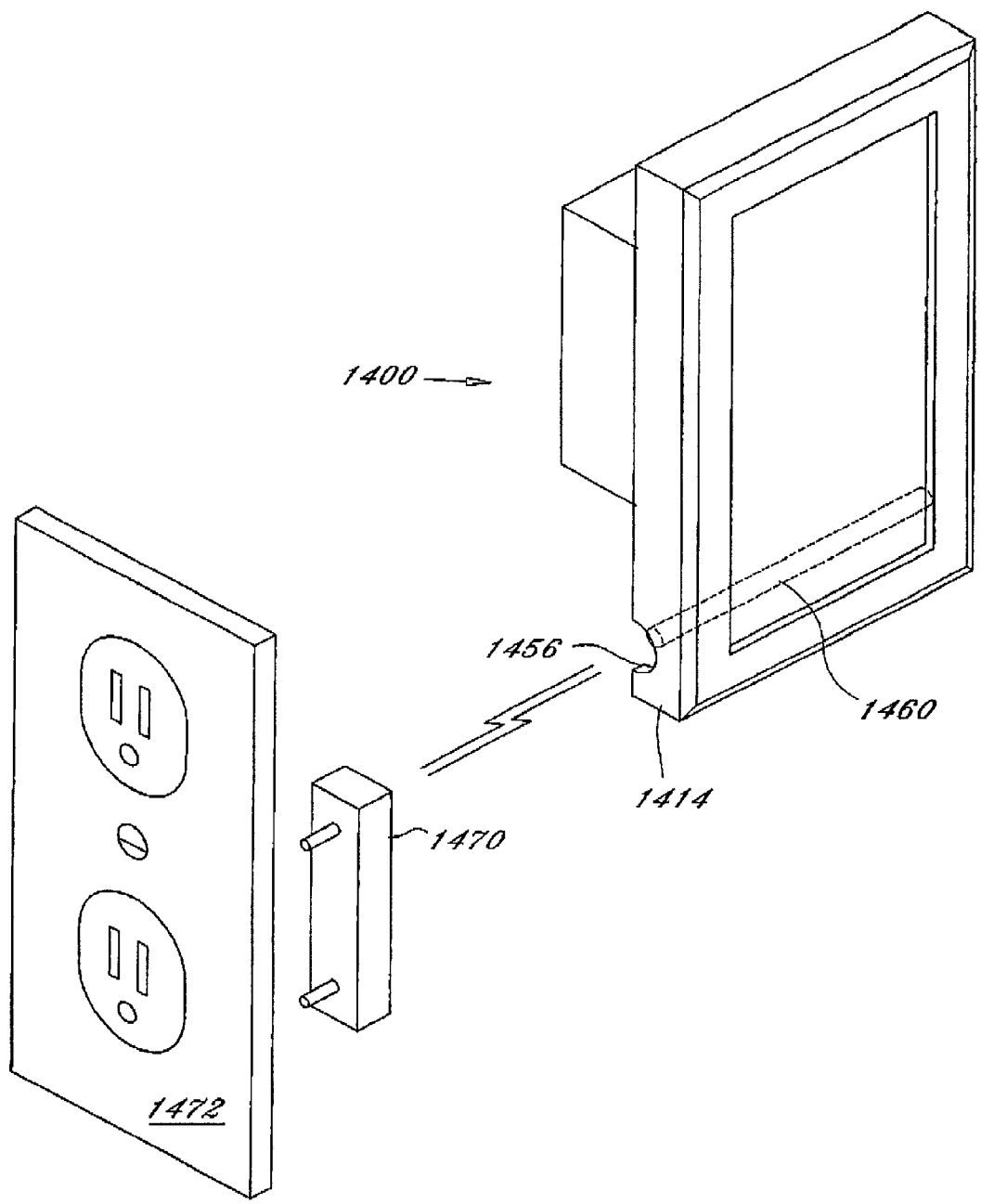
FIG. 48 illustrates the controlled receptacle feature in accordance with the present invention.

FIGS. 44 and 45 illustrate decorative pieces 1300 that can be attached to cover/outer frame 1310. Decorative pieces are preferably removably attached by a dowel or protrusion 1320 and recess 1322 combination. In one embodiment dowels 1320 are associated with the outer frame/cover 1310 and the recesses are provided on the decorative piece (FIG. 45a). Alternatively, the dowel can be provided on the decorative piece and one or more recesses are provided on the outer frame (FIG. 45b). In lieu of a dowel/recess combination, adhesives can be used, which also provides a more permanent attachment of decorative piece(s) 1300. Additionally, though not preferred, decorative pieces can be supported by the top edge of the outer frame without any attachment member.

FIGS. 46 and 47 illustrate another light switch assembly embodiment, which also provides for a portable flashlight during a power failure and is generally designated as reference numeral 1400. The assembly embodiment generally includes several components, including box/cover mounting bracket 1402, carrying member/circuit board holder 1404, circuit board 1406 (i.e. PC board), lamp or lighting sheet 1408 ("lamp"), lamp/lighting sheet holder 1410 ("lamp holder"), artwork 1412 and cover/outerframe 1414. The components generally operate similar to like components described above, which is incorporated by reference and will not be repeated. The portion of this embodiment which differs will be discussed below.

A tiny electromagnet 1420, which can be energized by the existing switch legs 1422 via wiring (not shown), can be provided on box/mounting bracket 1402. When power is on through the building associated with the light switch assembly, the magnet is energized and pulls up (locking position) a free-floating metal pin 1424 associated with carrying member/circuit board holder 1404. In this position, holder 1404, and its attached lamp 1404 and lamp holder 1410 cannot be removed out of their position within box/ mounting bracket 1402. In the event of a power failure or if an associated electrical breaker is turned off, the electromagnet is de-energized, thus causing the metal pin to drop or return to its non-locking position. Thus, holder 1404, along with lamp 1404 and lamp holder 1410, can be removed from their position within box/mounting bracket 1402. Once power has been lost, the battery back-up kicks in, as discussed above with other embodiments, and the removed unit is transformed into an individual hand-held emergency flashlight. An on/off switch 1444 can be provided, to save battery life, when light is not needed, such as, though not limited to, during daytime when sufficient light is provided by the sun. The locking pin can be conically shaped, though such is not limiting, to provide for easier clearance or positioning. When the relevant portion of assembly 1400 is removed (i.e. used as a flashlight, etc.), indicia can be disposed on box/mounting bracket 1402, preferably for informational purposes (i.e. direction of closest exit, etc.).

A locking port 1430 can be provided for receipt of a screw (i.e. set screw), where the assembly is not intended to be used as an emergency flashlight. For this use, the magnet/locking pin portion of the embodiment can be eliminated. Furthermore, the embodiment can include both the magnet/locking pin portion and the locking port/screw portion. Additionally, a recess 1446 can be provided in frame 1414 for mating with a protrusion (not shown), but preferably corresponding substantially in shape to recess 1446. Additionally, holder (switch assembly) 1404 can be provided with a locking ridge, preferably around its perimeter for mating with lamp holder 1410, which can provided for a water tight attachment. In one embodiment, lamp holder 1410 can be clear or transparent and can be preferably constructed from a flexible material to allow actuation of the switches disposed behind it when the assembly 1400 is properly assembled.

When holder 1404 is to be removed, cutouts 1432 can be provided on box/mounting bracket 1402 for easier removal. A gripping area 1440 of holder 1404, can be provided with anti-slip finger grips 1442, or other tactile/handling surfaces. Mounting bracket 1402 can also be provided with a locking ridge for receiving and retaining cover/outer frame 1414, which can be decorative.

In the preferred embodiment, to attach circuit board 1406 to holder 1404, one or more pins or dowels 1434 protruding from holder 1404 are inserted through corresponding apertures 1436 on board 1406. Once inserted pins/dowels 1434 are melted, to create a bond, preferably by use of a hot tip molding tool.

Box/mounting bracket 1402 is preferably provided with an electrical connector 1450, for wiring existing building switch legs 1422 (wires) to assembly 1400. Box/mounting bracket 1402 can also be provided with apertures or cutouts 1454 which aligned with apertures or cutout 1456 of frame 1414 when assembly 1400 is properly assembled, to allow for an optical motion sensor 1460, which is preferably attached or associated with circuit board 1406. Preferably, sensor 1460 is an extruded clear plastic which shoots a beam out of aperture/cutouts 1454 and 1456. However this design of sensor 1460 is not considered limiting and other sensors can be used and are considered within the scope of the invention.

Thus, given the typical light switch position in a room, when the room's door is open the infra-red sensor 1460 is tripped, as the door will pass through the beam. The circuitry associated with sensor 1460 can be in communication with any one of a plurality of devices, light switch, radio, television, night light, outdoor lights, etc. In one embodiment, a controlled receptacle module 1470 having communication intelligence can be attached to the stab ports of a conventional receptacle 1472. Sensor 1460 can be associated with a transmitter portion having a unique frequency. Thus, anytime a door passes through sensor 1460's beam, the transmitter sends a signal which is received by a receiver portion of controlled receptacle module 1470, causing whatever is plugged into receptacle 1472 (i.e. light, television, etc.) to turn on. Furthermore, each room can have its own unique frequency to avoid sensor 1460 in one room turning on a device plugged into a receptacle located in another room.

An automatic gradual dim switch/sensor 1480 can also be provided on assembly 1400. Switch 1480 gradually/periodically reduces the intensity of the lighting sheet (i.e every half-hour, etc.). A button/switch on the assembly can allow a user to set the starting intensity for the lighting sheet/lamp. When switch/sensor 1480 senses movement in the room, the light intensity returns to its starting point to provide an illuminated walkway for the user.

It should be understood that the various functions and features of the various embodiments of the present invention can be interchanged amongst embodiments, and all are considered within the scope of the invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cover assembly for a rocker or tactile switch attached to an electrical box and having an operating lever, comprising:
    a cover plate including a substantially rigid outer frame having a peripheral shape and a flexible surface attached to the rigid outer frame;
    an inner frame having a substantially same peripheral shape as the peripheral shape of said outer frame, said inner frame received within said outer frame;
    a mounting bracket attached to said inner frame and adapted for abutment to a wall area surrounding the light switch such that the light switch operating lever is covered by the cover plate.

2. The cover assembly of claim 1 wherein said flexible surface having indicia disposed on its outer surface.

3. The cover assembly of claim 1 wherein said inner frame having an aperture having a substantially same shape as a peripheral shape of said mounting bracket; wherein said mounting bracket received with the aperture of said inner frame when attaching said inner frame to said mounting bracket.

4. The cover assembly of claim 3 wherein said inner frame further including a second aperture and said mounting bracket including an aperture; said second aperture of said inner frame and said mounting bracket aperture aligned with each other when attaching said inner frame to said mounting bracket to allow an attachment screw to be inserted in said inner frame second aperture and said mounting bracket aperture to securely attached said inner frame to said mounting bracket.

5. The cover assembly of claim 4 wherein said inner frame second aperture and said mounting bracket aperture are threaded.

6. The cover assembly of claim 1 wherein said light switch is operable when said cover plate covers the operating lever.

7. A cover assembly for a rocker or tactile type light switch, comprising:

a face plate member constructed from a flexible material; and means for attaching said face plate member so that it completely covers an operating lever of a light switch; wherein the light switch still being operable when said face plate member covers the operating lever.

8. The cover assembly of claim 7 further including a mounting bracket member, said mounting bracket member having at least one aperture for receipt therethrough of a portion of said light switch.

9. The cover assembly of claim 8 wherein a plurality of light switches are provided and said mounting bracket member provided with a plurality of aperture, each of said apertures being associated with corresponding one of said light switches.

10. The cover assembly of claim 9 wherein said mounting bracket further including a diverter bar disposed between each of said apertures of said mounting bracket.

11. A cover assembly for a rocker or tactile type light switch which is attached to an electrical box and includes an operating lever:

a face plate constructed from a flexible material, said face plate including a lip member disposed around an outer edge area of a front portion of said face plate, said lip member and said front portion defining a groove therebetween;

a mounting bracket adapted for attachment to the light light switch, said mounting bracket having an opening, the operating lever of the light switch extending through said opening, said mounting including a flange member disposed around an outer edge area of said mounting bracket; and first means for attaching said face plate to said mounting bracket so that it completely covers the operating lever of the light switch;

wherein the light switch still being operable when said face plate covers the operating lever;

wherein said flange member disposed within said groove to define a second means for attaching said face plate to said mounting bracket.

12. The cover assembly of claim 11 wherein said first means for attaching includes a plurality of receiving ports disposed on said inner surface of said face plate and a plurality of protruding peg members disposed on said outer surface of said mounting bracket; each of said receiving ports associated with a respective peg member, a portion of said peg members being snugly received within their associated receiving port when said face plate is attached to said mounting bracket.

* * * * *